(12) United States Patent
Lu et al.

(10) Patent No.: US 8,086,085 B2
(45) Date of Patent: Dec. 27, 2011

(54) COMPACT BLIND MATEABLE OPTICAL SPLITTER

(75) Inventors: Yu Lu, Eden Prairie, MN (US); John Clifton Cobb, III, Fitchburg, MA (US); Randy Reagan, Morristown, NJ (US); Jeffrey Gniadek, Northbridge, MA (US); Keith Millea, Sutton, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/645,086

(22) Filed: Dec. 22, 2009

(65) Prior Publication Data

US 2011/0002591 A1 Jan. 6, 2011

Related U.S. Application Data

(63) Continuation of application No. 11/213,772, filed on Aug. 30, 2005, now Pat. No. 7,636,507.

(60) Provisional application No. 60/691,228, filed on Jun. 17, 2005.

(51) Int. Cl.
G02B 6/00 (2006.01)
G02B 6/26 (2006.01)
G02B 6/42 (2006.01)

(52) U.S. Cl. ............. 385/135; 385/31; 385/92; 385/134

(58) Field of Classification Search ............... 385/31, 385/92, 94, 135–137
See application file for complete search history.

(56) References Cited

U.S. PATENT DOCUMENTS

| 4,708,430 A | 11/1987 | Donaldson et al. |
| 4,840,568 A | 6/1989 | Burroughs et al. |
| 5,189,410 A | 2/1993 | Kosugi et al. |
| 5,199,878 A | 4/1993 | Dewey et al. |
| 5,261,019 A * | 11/1993 | Beard et al. ............ 385/60 |
| 5,317,663 A | 5/1994 | Beard et al. |
| 5,339,379 A | 8/1994 | Kutsch et al. |
| 5,363,465 A | 11/1994 | Korkowski et al. |
| 5,393,249 A | 2/1995 | Morgenstern et al. |
| 5,402,515 A | 3/1995 | Vidacovich et al. |
| 5,432,875 A | 7/1995 | Korkowski et al. |
| 5,467,062 A | 11/1995 | Burroughs |
| 5,497,444 A | 3/1996 | Wheeler |
| 5,613,030 A | 3/1997 | Hoffer et al. |
| 5,627,925 A | 5/1997 | Alferness et al. |

(Continued)

FOREIGN PATENT DOCUMENTS

DE 41 30 706 A1 3/1993

(Continued)

OTHER PUBLICATIONS

ADC Telecommunications, Inc., OmniReach FTTP Solutions, Doc. No. 1276550, dated May 2004, 12 pp.

(Continued)

*Primary Examiner* — Rhonda Peace
(74) *Attorney, Agent, or Firm* — Merchant Gould P.C.

(57) ABSTRACT

A splitter assembly may include an adapter housing configured to support an adapter to receive an optical signal from an incoming optical fiber. The splitter assembly may include a splitter module configured to couple to the adapter via a connector to receive the optical signal associated with the incoming fiber, and to make the optical signal available to an output fiber via an optical splitter.

20 Claims, 21 Drawing Sheets

U.S. PATENT DOCUMENTS

| | | | |
|---|---|---|---|
| 5,685,741 A | 11/1997 | Dewey et al. | |
| 5,694,511 A | 12/1997 | Pimpinella et al. | |
| 5,701,380 A | 12/1997 | Larson et al. | |
| 5,717,810 A | 2/1998 | Wheeler | |
| 5,809,190 A | 9/1998 | Chen | |
| 5,946,440 A | 8/1999 | Puetz | |
| 6,208,796 B1 | 3/2001 | Vigliaturo | |
| 6,226,111 B1 | 5/2001 | Chang et al. | |
| 6,263,136 B1 | 7/2001 | Jennings et al. | |
| 6,307,998 B2 | 10/2001 | Vigliaturo | |
| 6,363,183 B1 | 3/2002 | Koh | |
| 6,366,714 B1* | 4/2002 | DeBoynton et al. | 385/16 |
| 6,370,294 B1 | 4/2002 | Pfeiffer et al. | |
| 6,418,262 B1 | 7/2002 | Puetz et al. | |
| 6,424,781 B1 | 7/2002 | Puetz et al. | |
| 6,511,230 B1* | 1/2003 | Connelly et al. | 385/58 |
| 6,532,332 B2 | 3/2003 | Solheid et al. | |
| 6,535,682 B1 | 3/2003 | Puetz et al. | |
| 6,556,738 B2 | 4/2003 | Pfeiffer et al. | |
| 6,556,763 B1 | 4/2003 | Puetz et al. | |
| 6,579,014 B2 | 6/2003 | Melton et al. | |
| 6,591,051 B2 | 7/2003 | Solheid et al. | |
| 6,599,024 B2 | 7/2003 | Zimmel | |
| 6,614,953 B2 | 9/2003 | Strasser et al. | |
| RE38,311 E | 11/2003 | Wheeler | |
| 6,647,197 B1 | 11/2003 | Marrs et al. | |
| 6,648,520 B2 | 11/2003 | McDonald et al. | |
| 6,668,108 B1 | 12/2003 | Helkey et al. | |
| 6,760,531 B1 | 7/2004 | Solheid et al. | |
| 6,810,193 B1 | 10/2004 | Müller | |
| 6,822,874 B1 | 11/2004 | Marler | |
| 6,832,035 B1 | 12/2004 | Daoud et al. | |
| 6,850,685 B2 | 2/2005 | Tinucci et al. | |
| 6,863,446 B2 | 3/2005 | Ngo | |
| 6,865,332 B1 | 3/2005 | Saravanos et al. | |
| 6,885,798 B2 | 4/2005 | Zimmel | |
| 6,937,807 B2 | 8/2005 | Franklin et al. | |
| 6,983,095 B2 | 1/2006 | Reagan et al. | |
| 7,086,789 B2* | 8/2006 | Tomita et al. | 385/94 |
| 7,118,284 B2 | 10/2006 | Nakajima et al. | |
| 7,142,764 B2 | 11/2006 | Allen et al. | |
| 7,155,106 B2 | 12/2006 | Cianciotto et al. | |
| 7,194,181 B2 | 3/2007 | Holmberg et al. | |
| 7,200,317 B2 | 4/2007 | Reagan et al. | |
| 7,218,827 B2 | 5/2007 | Vongseng et al. | |
| 7,218,828 B2 | 5/2007 | Feustel et al. | |
| 7,260,301 B2 | 8/2007 | Barth et al. | |
| 7,277,620 B2 | 10/2007 | Vongseng et al. | |
| 7,303,220 B2 | 12/2007 | Zellak | |
| 7,310,474 B2 | 12/2007 | Kanasaki et al. | |
| 7,346,254 B2 | 3/2008 | Kramer et al. | |
| 7,376,323 B2 | 5/2008 | Zimmel | |
| 7,400,813 B2 | 7/2008 | Zimmel | |
| 7,457,503 B2 | 11/2008 | Solheid et al. | |
| 7,636,507 B2 | 12/2009 | Lu et al. | |
| 2001/0036352 A1* | 11/2001 | Kadar-Kallen et al. | 385/136 |
| 2002/0181896 A1 | 12/2002 | McClellan et al. | |
| 2003/0063869 A1* | 4/2003 | Elkins et al. | 385/87 |
| 2003/0132685 A1 | 7/2003 | Sucharczuk et al. | |
| 2003/0134541 A1 | 7/2003 | Johnsen et al. | |
| 2003/0147597 A1 | 8/2003 | Duran | |
| 2003/0174996 A1 | 9/2003 | Henschel et al. | |
| 2003/0202529 A1 | 10/2003 | Jarett | |
| 2005/0002633 A1 | 1/2005 | Solheid et al. | |
| 2005/0074203 A1 | 4/2005 | Marion | |
| 2005/0105873 A1 | 5/2005 | Reagan et al. | |
| 2005/0129379 A1 | 6/2005 | Reagan et al. | |
| 2005/0232551 A1 | 10/2005 | Chang et al. | |
| 2005/0232565 A1 | 10/2005 | Heggestad et al. | |
| 2005/0281526 A1 | 12/2005 | Vongseng et al. | |
| 2006/0083468 A1 | 4/2006 | Kahle et al. | |
| 2006/0093301 A1 | 5/2006 | Zimmel et al. | |
| 2006/0269205 A1 | 11/2006 | Zimmel | |
| 2006/0269206 A1 | 11/2006 | Zimmel | |
| 2007/0154158 A1 | 7/2007 | Laurisch et al. | |
| 2008/0025684 A1 | 1/2008 | Vongseng et al. | |
| 2008/0063351 A1 | 3/2008 | Elkins, II et al. | |
| 2008/0138026 A1 | 6/2008 | Yow et al. | |
| 2008/0152291 A1 | 6/2008 | Graff et al. | |

FOREIGN PATENT DOCUMENTS

| | | |
|---|---|---|
| DE | 202 01 170 U1 | 5/2002 |
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| GB | 2 300 978 A | 11/1996 |
| WO | WO 96/36896 | 11/1996 |
| WO | WO 00/75706 A2 | 12/2000 |
| WO | WO 02/099528 A1 | 12/2002 |
| WO | WO 02/103429 A2 | 12/2002 |
| WO | WO 03/093889 A1 | 11/2003 |
| WO | WO 2006/127397 A1 | 11/2006 |

OTHER PUBLICATIONS

ADC Telecommunications, Inc., DSX-3 Digital Signal Cross-Connect, Doc. No. 274, dated Oct. 2004, 65 pp.

\* cited by examiner

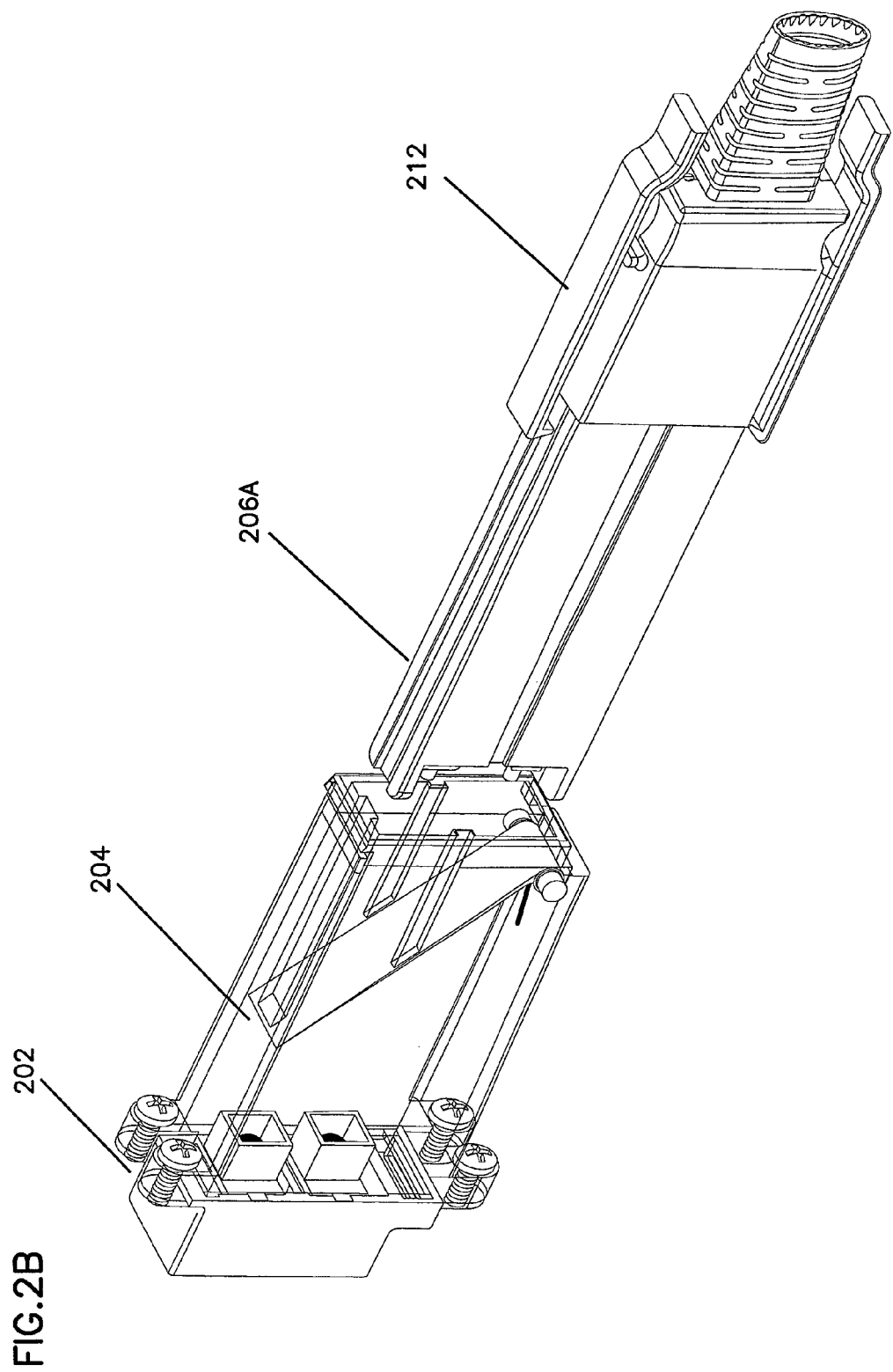

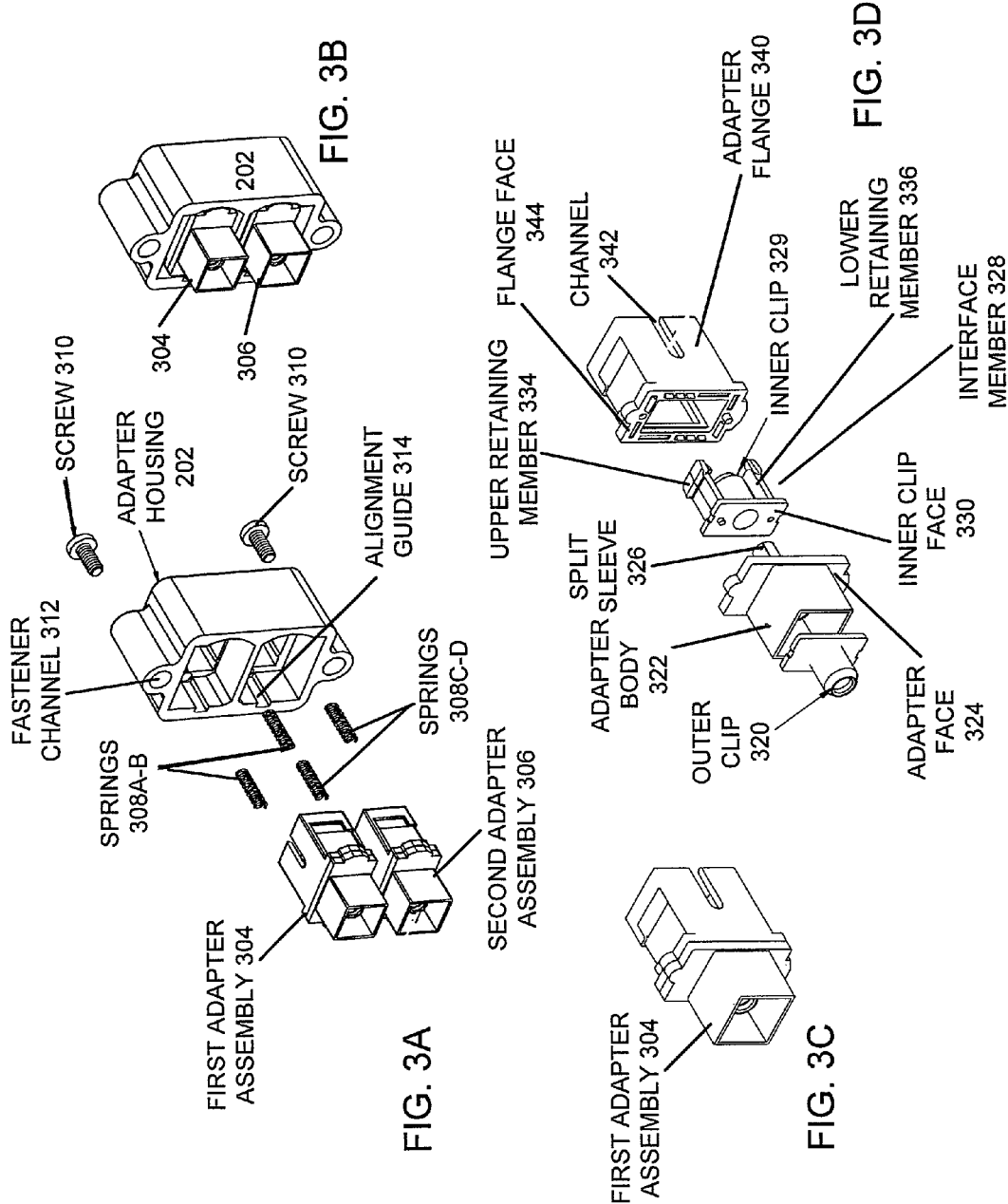

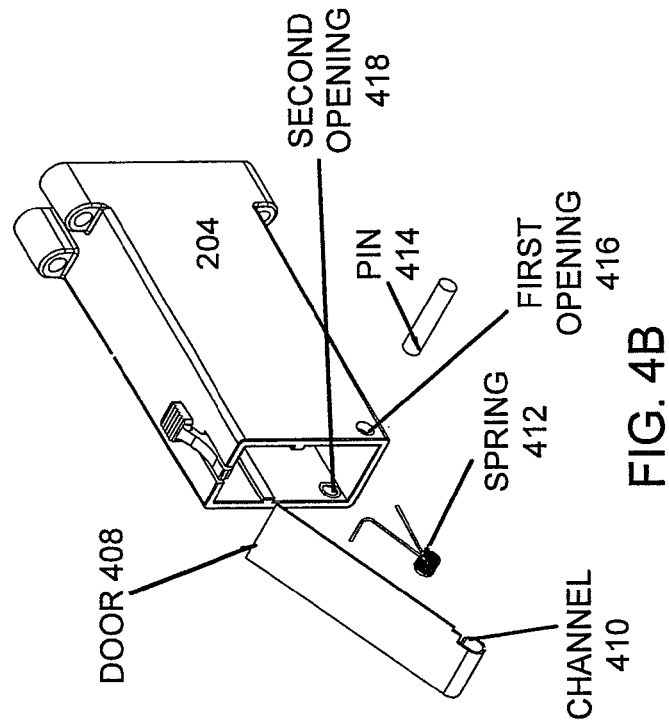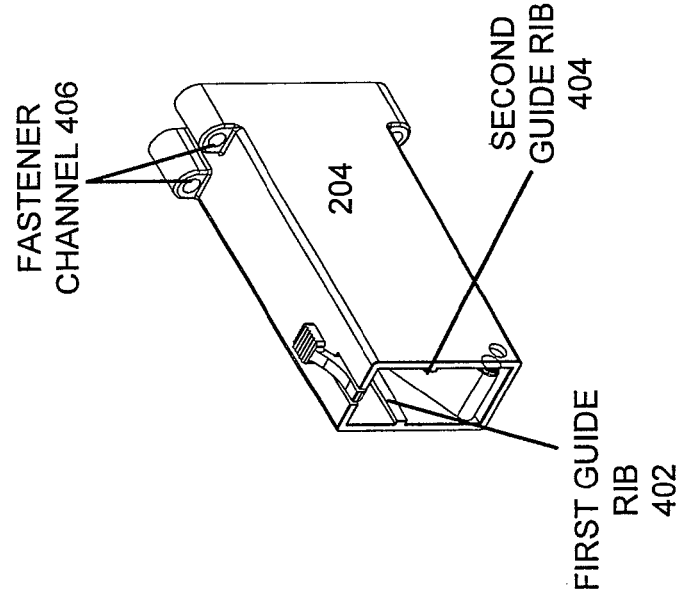

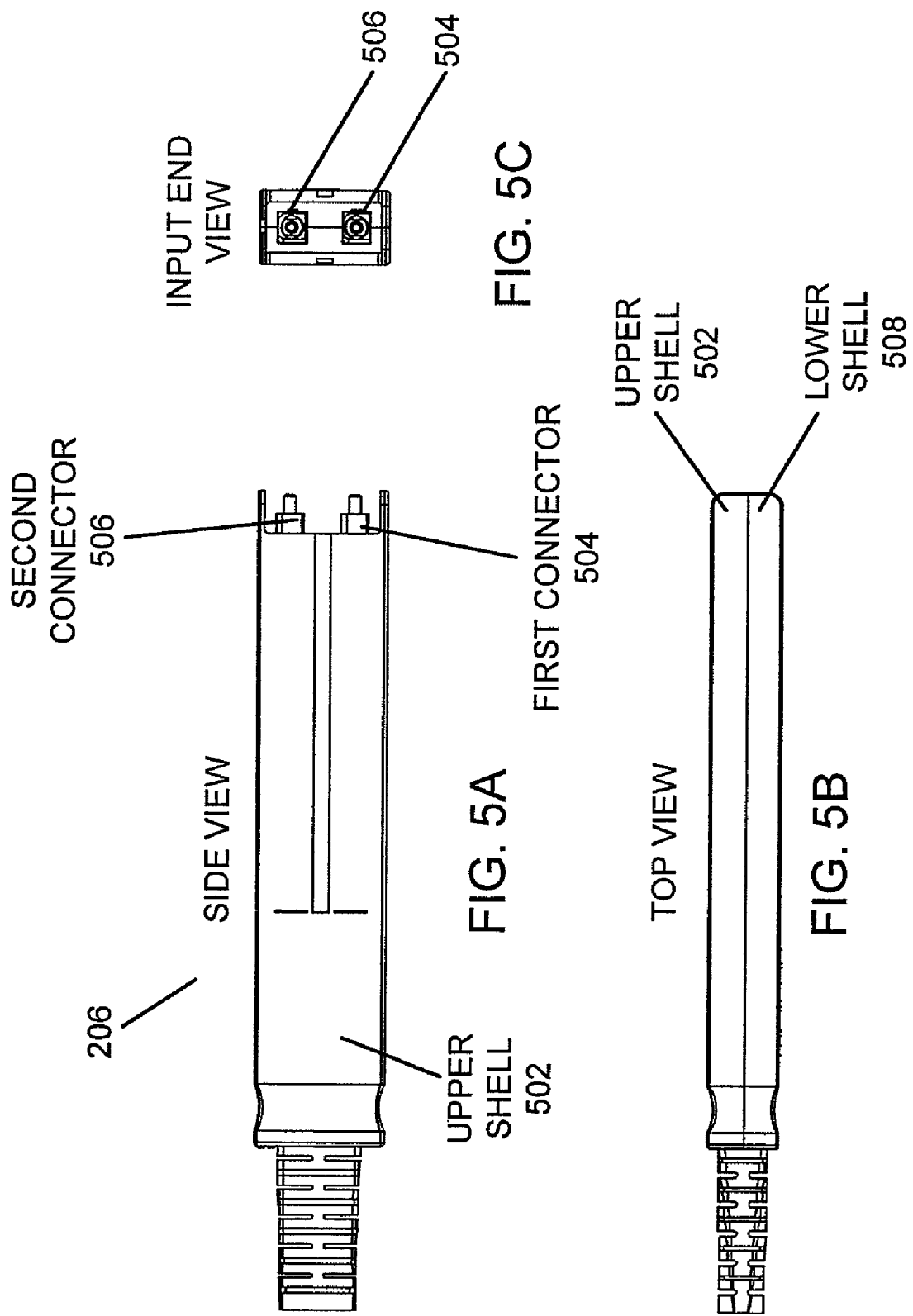

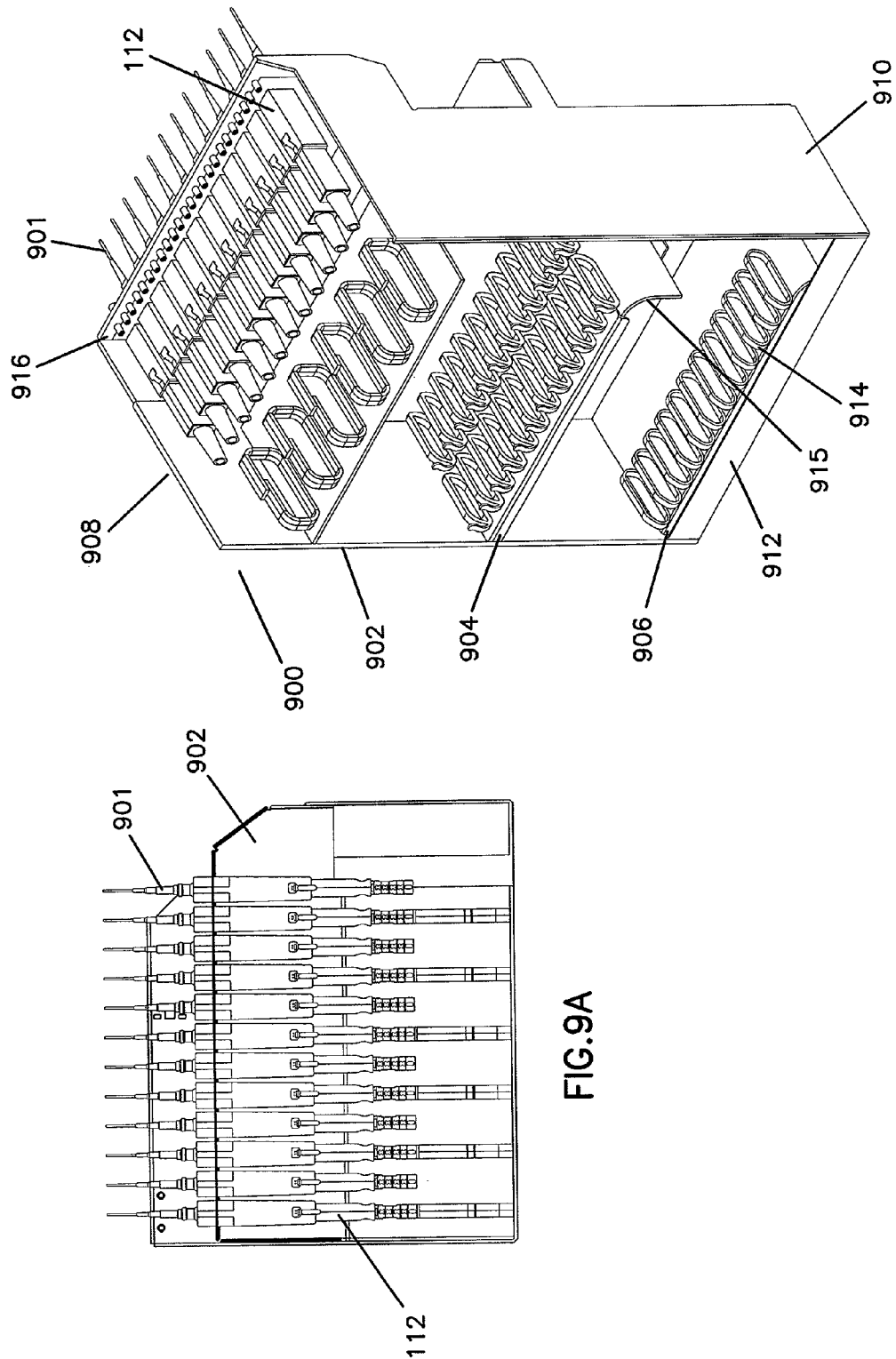

COMPACT BLIND MATEABLE OPTICAL SPLITTER

RELATED APPLICATIONS

The present application is a continuation of U.S. patent application Ser. No. 11/213,772, filed Aug. 30, 2005, now U.S. Pat. No. 7,636,507, which claims priority from U.S. provisional application 60/691,228, filed Jun. 17, 2005, the contents of which are incorporated by reference herein in their entireties.

FIELD OF THE INVENTION

The present invention generally relates to the field of optical communications and more specifically to passive optical splitters having a high splitting density.

BACKGROUND OF THE INVENTION

Passive optical networks are becoming prevalent in part because service providers want to deliver high bandwidth communication capabilities to customers. Passive optical networks may be desirable for delivering high speed communication data because they may not employ active electronic devices, such as amplifiers and/or repeaters, between a central office and a subscriber termination. The absence of active electronic devices may decrease network complexity and cost and may increase network reliability.

Passive optical networks may employ optical splitters to take a signal from an incoming fiber and make it available to a number of output fibers. For example, a distribution cable may include 24 optical fibers and may run from a central office to a distribution location, such as an equipment enclosure. At the equipment enclosure, each fiber in the distribution cable may be split into a number of outgoing fibers via an optical splitter module.

For example, an optical splitter may split an incoming signal into two outgoing signals. Individual optical splitters may be packaged in a steel tube and multiple optical splitters may be grouped together to provide a desired number of outgoing signals. When a number of individual optical splitters are grouped together, such as grouping 16 optical splitters together to obtain 32 outgoing fibers, a large volume may be required to house the grouped splitters. Individual optical splitters may be grouped into conventional splitter modules in an attempt to manage the complexity associated with grouping splitters when providing communication services.

Conventional splitter modules may be configured with an input pigtail that is configured to be spliced to a distribution fiber within the enclosure. When conventional splitter modules are installed in an enclosure, a linesman may have to splice the conventional splitter module to an incoming distribution fiber using a field splice. Field splices may be time consuming to perform properly, prone to problems, such as contamination from dirt and/or misaligned fibers at the splicing location, and/or may require specially trained personnel. The individual input pigtail may be coupled to a number of optical splitters within the conventional splitter module. The interior of conventional splitter modules may become crowded due to the number of individual optical splitters contained therein and the number of input fibers and output fibers associated with the optical splitters. Conventional splitter modules may also be configured with a number of output pigtails that may be connected to subscriber terminations via connectors and/or splicing.

Conventional splitter modules may be configured to mount in a chassis within the enclosure. Conventional splitter modules may be relatively large and may discourage achieving a desired level of connection density within the enclosure. For example, a conventional 1:16 or 1:32 splitter module may occupy on the order of 30 to 90 cubic inches (cu-in) of space. The large size of conventional splitter modules may limit connection densities because of the number of splitter modules that can fit inside standard enclosures.

Passive optical network deployments may benefit from new techniques for coupling optical splitter modules to incoming distribution fibers without using field splices. Passive optical networks may also benefit from optical splitter modules that facilitate achieving higher connection densities within an enclosure as compared to connection densities achieved when using conventional splitter modules.

SUMMARY OF THE INVENTION

In accordance with an implementation, a splitter assembly is provided. The splitter may include an adapter housing having a first side and a second side and configured to support an adapter in a determined position relative to the housing, where the adapter is configured to receive a first connector on the first side, where the first connector is associated with an incoming optical fiber carrying an incoming optical signal. The splitter assembly may include a splitter module configured to couple to the adapter via the second side using a second connector where the second connector is adapted to receive the incoming optical signal, and make the incoming optical signal available to an output fiber in cooperation with an optical splitter.

In accordance with another implementation, an adapter housing is provided. The adapter housing may include a first opening configured to receive a first adapter that is configured to receive a first input connector via a first end of the first adapter, where the first input connector is associated with a first incoming optical fiber that carries a first incoming optical signal. The first adapter may be configured to make the first incoming optical signal available to an optical splitter via a second end of the first adapter in a manner that facilitates blind mating the second end of the first adapter to a first splitter connector associated with the optical splitter.

In accordance with yet another implementation, a splitter module guide is provided. The splitter module guide may include a housing that includes a first end that is configured to include a first opening to receive a first end of a splitter module that includes an input connector adapted to receive an incoming optical signal. The housing may include a second end configured to include a second opening to receive a first side of an adapter that is adapted to make the incoming optical signal available to the input connector via a blind mated connection.

In accordance with still another implementation, a splitter module is provided. The splitter module may include a first connector adapted to receive a first incoming optical signal from an adapter. The splitter module may include a splitter adapted to receive the incoming optical signal via an input fiber and split the incoming optical signal into a group of output signals. The splitter module may include a group of output fibers adapted to receive the group of output signals from the splitter via a group of proximal ends and to make the output signals available to a destination via a group of distal ends. The splitter module may include a housing adapted to support the first connector in a position to facilitate blind mating the first connector with the adapter, where the adapter makes the incoming optical signal available to the first connector. The housing may be adapted to support the splitter in an interior region of the housing. The housing may be adapted to support the group of proximal ends of the output fibers, and to engage an interior portion of a splitter module guide to facilitate the blind mating of the adapter to the first connector.

In accordance with yet another implementation, a latching device for use on an optical splitter module that is adapted to receive an optical signal from an adapter is provided. The latching device may include a coupling surface associated with the optical splitter module, where the coupling surface is adapted to engage a mating surface to maintain the optical splitter module in a determined relationship with a splitter module guide or the adapter.

In accordance with still another implementation, a method for configuring an enclosure is provided. The method may include mounting an adapter housing that includes an adapter having a first side and a second side. The method may include mounting a splitter module guide in the enclosure. The method may include coupling a connector associated with a distribution fiber that carries an incoming optical signal to the first side of the adapter to make the incoming optical signal available to the adapter.

In accordance with yet another implementation, an enclosure for making an optical communication signal available to a subscriber in an optical communications network is provided. The enclosure may include means for receiving an incoming optical signal. The enclosure may include means for guiding an optical splitting means to the receiving means to facilitate a blind mated connection between the optical splitting means and the receiving means, where the blind mated connection makes the incoming optical signal available to the splitting means. The enclosure may include means for making a split optical signal available to a subscriber termination, where the subscriber termination is associated with the subscriber.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 2B illustrates a perspective view of an exemplary implementation of a splitter assembly that includes an adapter housing, a splitter module guide and an implementation of a splitter module that includes a latching device consistent with the principles of the invention;

FIG. 3A illustrates exemplary components that may be used in an exemplary implementation of an adapter housing consistent with the principles of the invention;

FIG. 3B illustrates an assembled adapter housing consistent with the principles of the invention;

FIG. 3C illustrates an exemplary implementation of an assembled adapter assembly consistent with the principles of the invention;

FIG. 3D illustrates a collection of exemplary components that may be used in an adapter assembly consistent with the principles of the invention;

FIG. 4A illustrates an exemplary splitter module guide consistent with the principles of the invention;

FIG. 4B illustrates a collection of exemplary components that may be used in an exemplary implementation of a splitter module guide consistent with the principles of the invention;

FIG. 5A illustrates a side view of an exemplary implementation of splitter module 206 consistent with the principles of the invention;

FIG. 5B illustrates a top view of an exemplary implementation of splitter module 206 consistent with the principles of the invention;

FIG. 5C illustrates an end view showing the inputs to an exemplary implementation of a splitter module consistent with the principles of the invention;

FIG. 9A illustrates an exemplary arrangement of splitter assemblies supported on an upper shelf consistent with the principles of the invention;

FIG. 9B illustrates an exemplary arrangement of splitter module shelves in a frame suitable for use in an enclosure consistent with the principles of the invention;

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Figure 1:
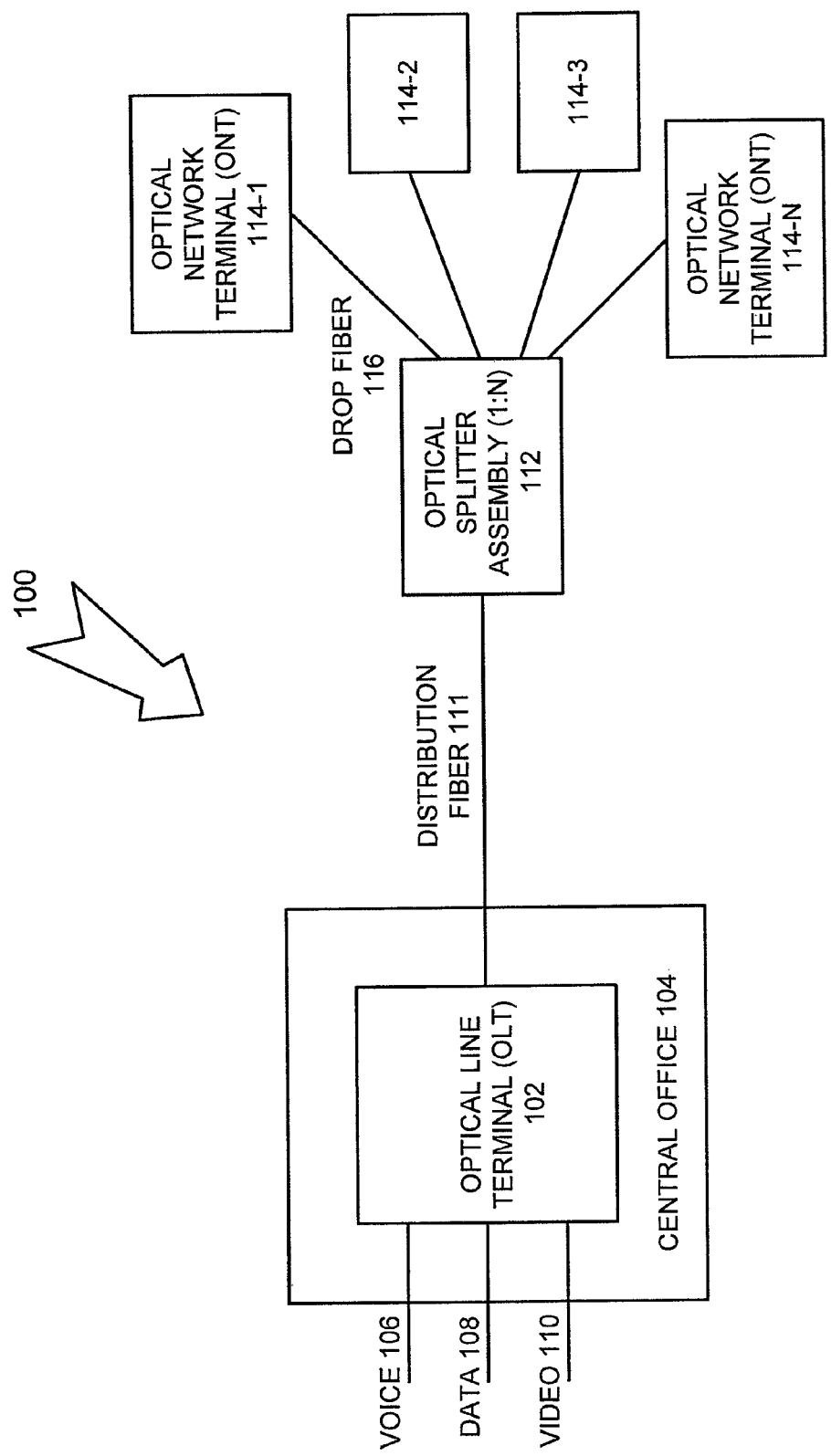
FIG. 1 illustrates an exemplary system for providing optical communication signals to a subscriber via a splitter assembly consistent with the principles of the invention.

FIG. 1 illustrates an exemplary system for providing optical communication signals to a subscriber via an optical splitter assembly consistent with the principles of the invention. System 100 may include an optical line terminal (OLT) 102, a central office 104, voice 106, data 108, video 110, distribution fiber 111, optical splitter assembly 112, drop fiber 116 and optical network terminals (ONTs) 114-1 to 114-N (collectively ONT 114).

OLT 102 may include any device configured to receive one or more channels of information and to make the information available to one or more optical fibers. OLT 102 may use wavelength division multiplexing (WDM) techniques to provide bidirectional communication capabilities in system 100. For example, OLT 102 may receive voice 106, data 108 and video 110 via an input side and may make voice 106, data 108 and video 110 available to optical splitter assembly 112 via distribution fiber 111. Implementations of OLT 102 may encode voice 106 via an optical wavelength on the order of approximately 1310 nanometers (nm), data 108 via an optical wavelength on the order of approximately 1490 nm, and video 110 via an optical wavelength on the order of approximately 1550 nm. OLT 102 may receive data from ONT 114 and may make the data available to voice 106, data 108 and/or video 110.

Central office 104 may include any structure configured to house OLT 102. Central office 104 may include a building operated by a telecommunications provider. Central office 104 may include switching equipment, line testing equipment, call connection equipment, additional OLTs 102, etc. Central office 104 may operate to receive voice 106 from telecommunications equipment associated with the telecommunications provider, data 108 from an Internet service provider (ISP) and/or video 110 from a cable television provider. Central office 104 may operate as an aggregating entity by making voice 106, data 108 and video 110 available to an input side of OLT 102 for distribution to splitter assembly 112 via a multiplexed channel.

Voice 106 may include any data stream that includes voice data. Voice data may be in analog and/or digital form and may arrive at OLT 102 via copper conductors, optical fibers, and/or free-space wireless links. Data 108 may include any data stream that includes machine-readable and/or human-readable information associated with data, such as numerical data, scientific data, literary/entertainment data, financial data, medical data, and/or network monitoring data. Data 108 may include still images, computer files, function-executable code, and the like. Data 108 may be in analog and/or digital form and may arrive at OLT 102 via copper conductors, optical fibers and/or free-space wireless links.

Video 110 may include any data stream that includes video data. Video data may be in analog and/or digital form and may arrive at OLT 102 via copper conductors, optical fibers and/or free-space wireless links. Voice 106, data 108 and video 110 may be encoded into data units having a packet and/or non-packet format. Therefore, disclosed implementations are not limited to any particular type of data unit format and/or protocol.

Distribution fiber 111 may include any device configured to include one or more optical fibers for carrying optical signals from a source to a destination. Implementations may include distribution fiber 111 that carries communication signals from a central office to a field installed enclosure, such as a fiber distribution hub, that may include one or more optical splitter assemblies 112. Distribution fiber 111 may be included in a distribution cable having on the order of 12 to 48 fibers. Alternative implementations of distribution fiber 111 may include fewer or more fibers without departing from the spirit of the invention. Distribution fiber 111 may convey optical signals via fibers only and/or via fibers and free-space optical links.

Optical splitter assembly (hereinafter splitter assembly 112) may include any device configured to receive an incoming optical signal and split the incoming optical signal into two or more outgoing optical signals. Splitter assembly 112 may be an active device, a passive device, and/or a hybrid device including both active and passive capabilities. Splitter assembly 112 may support bidirectional communication between one or more ONTs 114 and/or one or more OLTs 102. Splitter assembly 112 may also receive optical signals on multiple drop fibers 116 and couple those signals onto a single fiber, such as distribution fiber 111.

Implementations of splitter assembly 112 may facilitate making a single port on OLT 102 available to multiple subscribers. For example, implementations of splitter assembly 112 may employ one or more optical splitters to accommodate splitting ratios of 1:2, 1:4, 1:8, 1:16, and 1:32, and/or 2:16, and/or 2:32. Splitter assembly 112 may accommodate other splitting ratios, including splitting ratios greater than 1:32 and/or 2:32. Splitter assembly 112 may be configured to mount in an enclosure, such as a fiber distribution hub. Splitter assembly 112 may be configured to operate with an adapter housing to receive an input connector associated with distribution fiber 111. Splitter assembly 112 may be configured with a group of output pigtails having connectorized ends adapted for coupling to a subscriber termination. "Connectorized" as used herein, may refer to a device, component and/or structure that is adapted for use with a connection device, component and/or structure, such as a fiber optic connector and/or adapter that can be used to terminate an optical fiber. A subscriber termination may be associated with a premises associated with a subscriber of communication services delivered via OLT 102.

ONT 114 may include any device configured to receive an incoming optical signal and to make information associated with the incoming optical signal available to a destination. For example, ONT 114 may receive an incoming WDM signal from drop fiber 116. The incoming WDM signal may include voice 106, data 108 and/or video 110. ONT 114 may demultiplex the incoming signal and provide voice 106 to a telephone via twisted-shielded pair conductors, data 108 to a computer via an Ethernet connection, and/or video 110 to a television set via co-axial cable and/or optical fiber.

ONT 114 may be a passive device, an active device, or a hybrid device having both active and passive capabilities. ONT 114 may be supported on an exterior surface of a structure, such as a building. Implementations may be adapted to have one ONT 114 associated with each output of splitter assembly 112. For example, if splitter assembly 112 has 32 outputs, 32 ONTs 114 may be communicatively coupled with splitter assembly 112.

Drop fiber 116 may include any device configured to include one or more optical fibers for carrying optical signals from a source location to a destination. Implementations may include drop fiber 116 that carries communication signals from an enclosure housing splitter assembly 112 to a destination, such as a subscriber premise, that may include ONT 114. Drop fiber 116 may be included in a cable having a group of fibers therein. Alternatively, drop fiber 116 may include a single fiber. Drop fiber 116 may convey optical signals via fibers only and/or via fibers and free-space optical links.

While system 100 is shown with the devices and components of FIG. 1, other implementations are possible without departing from the spirit of the invention. Other implementation may include fewer devices and/or components, more devices and/or components, and/or other devices and/or components.

Figure 2A:
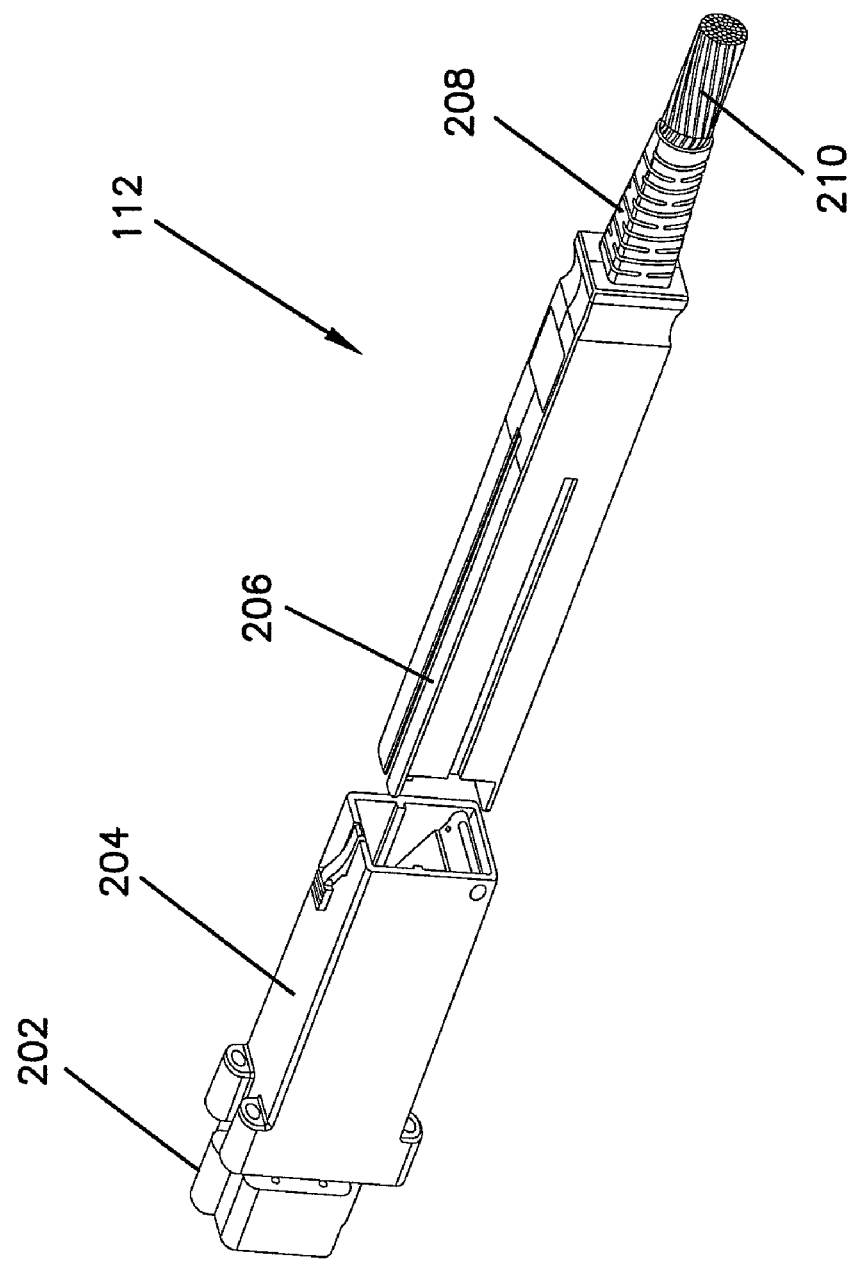
FIG. 2A illustrates a perspective view of an exemplary implementation of a splitter assembly that includes an adapter housing, a splitter module guide and a splitter module consistent with the principles of the invention.

FIG. 2A illustrates a perspective view of an exemplary implementation of a splitter assembly 112 that includes an adapter housing, a splitter module guide and a splitter module consistent with the principles of the invention. Splitter assembly 112 may include an adapter housing 202, a splitter module guide 204, a splitter module 206, an output boot 208 and an output bundle 210.

Adapter housing 202 may include any device, component and/or structure configured to house one or more fiber optic adapters that may be configured to mate with one or more fiber optic connectors. Adapter housing 202 may be adapted to mate with splitter module guide 204 and/or splitter module 206. Adapter housing 202 and/or splitter module guide 204 may be dimensioned and arranged to operate with a panel therebetween. For example, adapter housing 202 may be located against a rear surface of a panel, or bulkhead faceplate, and splitter module guide 204 may be located against a front surface of the panel.

Splitter module guide 204 may include any device, component and/or structure configured to receive splitter module 206. Splitter module guide 204 may operate to align splitter module 206 for coupling with a fiber optic adapter associated with adapter housing 202. Splitter module guide 204 may slideably engage splitter module 206 to facilitate connecting splitter module 206 with adapter housing 202. Splitter module guide 204 may be configured and dimensioned to facilitate blind connection between splitter module 206 and a panel connection, such as an adapter associated with adapter housing 202. "Blind connection" and/or "blind mateable", as used herein, may refer to connecting/mating techniques, devices, components, and/or structures that facilitate mating a first connector with a second connector, or adapter, without requiring that an operator, such as a linesman, manipulating one of the connectors has to maintain a precise orientation of one connector/adapter with respect to the other connector/adapter.

Splitter module 206 may include any device, structure and/or component configured to split an incoming optical signal into two or more outgoing optical signals. Splitter module 206 may include a splitting device configured to accept one or more incoming optical fibers and make signals on the incoming fibers available to two or more output fibers. The splitting device may be configured to facilitate bidirectional communication. Splitter module 206 may be configured to optically mate with one or more adapters associated with adapter housing 202 when splitter module 206 is supported by splitter module guide 204. Splitter module 206 may be dimensioned and configured to facilitate installation and removal by a linesman using one hand. Implementations of splitter module 206 may be adapted to operate with various types of optical splitting devices that can have different shapes and/or form factors. Optical splitting devices that can be used with implementation of splitter module 206 may also be made by more than one manufacturer. Splitter module 206 may be a passive device, an active device and/or a hybrid device having both passive and active capabilities.

Output boot 208 may include any device and/or structure configured to manage a bend radius associated with an optical fiber, provide strain relief to an optical fiber, provide mechanical and/or structural protection to an optical fiber, and/or facilitate maintaining an output fiber and/or group of output fibers, such as output bundle 210, in a desired relationship with splitter module 206 and/or another device and/or structure. Output boot 208 may be configured to operate with a number of individual fibers and/or with ribbons including a group of fibers. Output boot 208 may be fabricated from rigid material and/or compliant/flexible material, such as plastic, rubber and/or composite. Output boot 208 may include devices and/or structures to facilitate shaping, bending, arranging and/or configuring output bundle 210 according to pre-determined criteria and/or characteristics. Output boot 208 may operate with adhesives to retain optical fibers in determined positions.

Output bundle 210 may include one or more individual fibers and/or one or more ribbons that may each include a number of fibers. Output bundle 210 may include an outer jacket to protect and retain individual fibers and/or ribbons in a determined arrangement and/or position. Output bundle 210 may include fiber output pigtails configured and dimensioned for routing in an enclosure. Output bundle 210 may include a transition member located along a group of output pigtails and configured to install in a transition region of an enclosure. Use of a transition member may facilitate circumferential routing of output pigtails within an enclosure.

Splitter assembly 112 may be adapted to operate with backplanes, chasses, enclosures, distribution fibers, etc. that are manufactured by entities other than an entity manufacturing a substantial portion of splitter assembly 112. For example, splitter assembly 112 may operate with an adaptive backplane to interface with distribution fibers that were previously associated with a conventional splitter module employing, for example, a spliced input fiber. By adding and/or removing adapters, parts, components, etc., splitter assembly 112 may be adapted to operate in substantially any number of fiber optic enclosures, such as in fiber distribution hubs. Therefore, disclosed implementations of splitter assembly 112 are not limited to the configurations and/or implementations described herein.

FIG. 2B illustrates a perspective view of an exemplary implementation of a splitter assembly 112 that includes an adapter housing, a splitter module guide and an implementation of a splitter module that includes a latching device consistent with the principles of the invention. The implementation of FIG. 2B illustrates an alternative configuration of a splitter module 206, denoted as splitter module 206A, that may be configured with latching device 212. Latching device 212 may include any device, component, structure and/or technique that can be used to substantially retain splitter module 206A in a determined relationship with respect to splitter module guide 204 and/or adapter housing 202. Exemplary latching techniques are illustrated in conjunction with FIGS. 8A-K. The implementation of FIG. 2B further illustrates features associated with an interior portion of splitter module guide 204 and/or adapter housing 202.

FIG. 3A illustrates exemplary components that may be used in an exemplary implementation of an adapter housing 202 consistent with the principles of the invention. The implementation of FIG. 3A may include adapter housing 202, a first adapter assembly 304, a second adapter assembly 306, springs 308A-D, screws 310, a fastener channel 312, and an alignment guide 314.

Adapter housing 202 may provide a connectorized interface to splitter module 206. Adapter housing 202 may be fabricated from plastic, metal and/or composite using machining techniques and/or molding techniques. Adapter housing 202 may include a first opening for receiving first adapter assembly 304 and/or a second opening for receiving second adapter assembly 306. The first and second openings may each include one or more alignment guides 314. Alignment guide 314 may include any structure, device, and/or technique that may be adapted to guide and/or align first adapter assembly 304 and/or second adapter assembly 306 in respective openings of adapter housing 202. Alignment guide 314 may include a channel that may be configured to mate with a mating protuberance associated with first adapter assembly 304 and/or second adapter assembly 306.

Adapter housing 202 may be configured, dimensioned and/or arranged to allow first adapter assembly 304 and/or second adapter assembly 306 to float within determined limits to facilitate blind mating with one or more fiber optic connectors, such as fiber optic connectors associated with optical splitter 206 and/or fiber connectors associated with distribution fiber 111. Adapter housing 202 may include a chamfer to facilitate blind-mating of first adapter assembly 304 and/or second adapter assembly 306 with one or more fiber optic connectors. Adapter housing 202 may reduce and/or eliminate fiber loops associated with distribution fibers because distribution fibers may be terminated at a fixed length using a connector, such as a single coupling (SC) connector.

First adapter assembly 304 and/or second adapter assembly 306 may include any device, component, and/or structure configured to support a fiber optic adapter that may be configured to mate with a fiber optic connector. Implementations of first adapter assembly 304 and/or second adapter assembly 306 may be configured to accept an SC/APC connector, such as those that can be used in conjunction with 900 micrometer (μm) fiber optic cables. First adapter assembly 304 and/or second adapter assembly 306 may be fabricated from plastic, metal and/or composite and may be machined and/or molded. Implementations of first adapter assembly 304 and second adapter assembly 306 may include an SC and/or SC-II adapter, respectively. Other implementations may employ other adapters, such as LC, MU, MT-RJ, MT or ferrule self (1.25 mm and/or 2.5 mm), and/or MT-multi (e.g., 4, 8, 12 fiber) adapters and/or mating connectors.

First adapter assembly 304 may be installed in the first opening of adapter housing 202 in conjunction with springs 308A and 308B and second adapter assembly 306 may be installed in the second opening of adapter housing 202 in conjunction with springs 308C and 308D.

Springs 308A-D may include any device and/or structure configured to facilitate reliable and removable coupling of a fiber optic connector with first adapter assembly 304 and/or second adapter assembly 306. Springs 308A-D may exert a positive latching pressure and may operate to facilitate ejection of splitter module 206 when disengaged from an adapter and/or splitter module guide 204. For example, springs 308A-D may operate to displace splitter module 206 away from adapter housing 202 when latching device 212 is disengaged from splitter module guide 204.

Screws 310 may include any device and/or structure configured to releasably couple adapter housing 202 with another structure, such as splitter module guide 204 and/or a panel. Screws 310 may be adapted to fit through a fastener channel 312 associated with adapter housing 202.

FIG. 3B illustrates an assembled adapter housing consistent with the principles of the invention. In FIG. 3B first adapter assembly 304 and second adapter assembly 306 are shown mounted in adapter housing 202. The implementation of FIG. 3B may be releasably coupled to splitter module guide 204 using one or more screws 310.

FIG. 3C illustrates an exemplary implementation of an assembled adapter assembly consistent with the principles of the invention. In FIG. 3C, first adapter assembly 304 is illustrated.

FIG. 3D illustrates a collection of exemplary components that may be used in an adapter assembly consistent with the principles of the invention. The adapter assembly of FIG. 3D may include an outer clip 320, an adapter body 322 having an adapter face 324 and a split sleeve 326, an interface member 328 having an inner clip face 330, an upper retaining member 334, a lower retaining member 336 and an inner clip 329, an adapter flange 340 having a channel 342 and a flange face 344.

Outer clip 320 may include any device and/or structure configured to receive at least a portion of a fiber optic connector. Outer clip 320 may be adapted to mate with adapter body 322 via a mounting surface. The mounting surface may be configured to fit inside adapter body 322, against adapter body 322, and/or over adapter body 322.

Adapter body 322 may include any device and/or structure configured to facilitate coupling an optical signal to a destination. Adapter body 322 may be configured to mate with outer clip 320 on a first side and to mate with an interface member 328 via a second side. Adapter body 322 may include an adapter face 324 that may be configured to support split sleeve 326. Split sleeve 326 may include any device and/or structure configured to mate with interface member 328. Split sleeve 326 may include a protuberance that fits within an opening associated with interface member 328. A surface of adapter face 324 may be adapted to abut a surface of inner clip face 330 when an adapter assembly is assembled.

Interface member 328 may include any device and/or structure configured to facilitate coupling an optical signal to a destination. Interface member 328 may include an inner clip 329 that may include any device and/or structure configured to engage split sleeve 326. Interface member 328 may include an inner clip face 330 that may include an opening operatively associated with inner clip 329, a first face for mating against a surface of adapter face 324 and/or a second face for supporting an upper retaining member 334 and/or a lower retaining member 336.

Upper retaining member 334 and/or lower retaining member 336 may include any device and/or structure configured to releasably engage interface member 328 with adapter flange 340. Upper retaining member 334 and lower retaining member 336 may cooperatively operate to retain interface member 328 and adapter flange 340 in an engaged relationship by exerting pressure against an inner surface of adapter flange 340. Upper retaining member 334 and/or lower retaining member 336 may be dimensioned and configured with latching surfaces, such as hooks, ridges, channels, keys, etc., to facilitate engagement with an inner surface of adapter flange 340.

Adapter flange 340 may include any device and/or structure configured to receive an interface member 328. Adapter flange 340 may include a housing that has an inner volume having a first opening to receive at least a portion of interface member 328 and/or a second opening that may be made available to an inner volume associated with splitter module guide 204 and/or to a connector associated with splitter module 206. Adapter flange 340 may include a flange face 344 that may be adapted to abut a surface of adapter face 324 and/or inner clip face 330 when interface member 328 is engaged with adapter flange 340. Adapter flange 340 may include one or more channels 342 that may be adapted to facilitate aligning components associated with an adapter assembly and/or to facilitate aligning adapter flange 340 with splitter module guide 204 and/or splitter module 206. An inner surface of adapter flange 340 may be configured and dimensioned to facilitate engagement with upper retaining member 334 and/or lower retaining member 336.

FIG. 4A illustrates an exemplary splitter module guide 204 consistent with the principles of the invention. Splitter module guide 204 may include a housing having an exterior surface that may be configured to form an inner volume. The inner volume may be adapted to accept splitter module 206 via a first end and make splitter module 206 available to adapter housing 202 via a second end. The inner volume may include a first guide rib 402 and/or a second guide rib 404. First guide rib 402 and/or second guide rib 404 may include any device and/or structure configured to align and/or guide optical splitter module 206 as it is received via the first end of splitter module guide 204. First guide rib 402 and/or second guide rib 404 may run substantially the length of splitter module guide 204 and/or may span a portion of the length of splitter module guide 204. Splitter module guide 204 may include one or more fastener channels 406. Fastener channel 406 may be configured to receive a fastening device, such as a screw, to retain splitter module guide 204 in a determined relationship with respect to another structure, such as adapter housing 202 and/or a panel surface.

FIG. 4B illustrates a collection of exemplary components that may be used in an exemplary implementation of splitter module guide 204 consistent with the principles of the invention. Splitter module guide 204 may include door 408, channel 410, spring 412, pin 414, first opening 416, and second opening 418. A first end of splitter module guide 204 may be configured with door 408 to prevent dirt and debris from entering the inner volume of splitter module guide 204 when splitter module 206 is not present. Door 408 may include any device and/or structure configured to discourage the accumulation of debris within the inner volume of splitter module guide 204. Door 408 may function as a dust cover that does not have to be removed from splitter module guide 204.

Door 408 may be configured to operate as a safety device by preventing optical radiation from exiting splitter module guide 204 when optical splitter 206 is not engaged therewith. For example, a distribution fiber 111 may provide high intensity radiation to an adapter associated with adapter housing 202. Adapter housing 202 may in turn make the radiation available to the second end of splitter module guide 204. If splitter module 206 is not present, radiation may exit via the first end of splitter module guide 204 if door 408 is not in a closed position.

Door 408 may be pivotally supported on splitter module guide 204 via pin 414. Pin 414 may include any device and/or structure configured to allow rotation of door 408 about a pivoting location or axis. Pin 414 may pass through a first opening 416, through channel 410 and/or through second opening 418. Pin 414 may be retained in contact with first opening 416 and/or second opening 418 when installed in splitter module guide 204. Pin 414 may operate in conjunction with spring 412 to manipulate door 408 into a first position, such as a closed position, that may impede access to the inner volume of splitter module guide 204 when optical splitter module 206 is not present. Door 408 may prevent optical radiation associated with distribution fiber 111 from exiting splitter module guide 204 when door 408 is in the first position.

Door 408 may be configured to move to a second position, such as an open position, when splitter module 206 is engaged with splitter module guide 204. Door 408 may be configured so that its surfaces remain substantially free of debris when splitter module 206 is engaged with splitter module guide 204. Optical radiation associated with distribution fiber 111 may be made available to splitter module 206 when door 408 is in the second position. When splitter module 206 is removed from splitter module guide 204, door 408 may return to the first position in cooperation with forces provided by spring 412. Spring 412 may be configured to apply sufficient force so as to move door 408 into the closed position without allowing any radiation to reach an operator, such as a linesman.

Implementations may employ door 408 having a pivoting attachment point that is associated with a side and/or the top of splitter module guide 204 instead of with the bottom of splitter module guide 204 as shown in FIG. 4B. Door 408 may also be implemented in sections that may be operatively coupled together and/or operatively associated with each other. For example, door 408 may be implemented via two smaller doors operating together to substantially block the first end of splitter module guide 204 when in a closed position. Door 408 may be replaced by, or may operate with, a removable dust cover if desired.

FIG. 5A illustrates a side view of an exemplary implementation of splitter module 206 consistent with the principles of the invention. Splitter module 206 and/or 206A may include an upper shell 502, a lower shell 508 (FIG. 5B), a first connector 504 and a second connector 506. Upper shell 502 and/or lower shell 508 may include any device and/or structure configured to at least partially enclose an optical splitting device. Upper shell 502 and/or lower shell 508 may be fabricated from plastic, metal and/or composite and may be adapted to releasably engage each other.

Devices and/or structures operating as upper shell 502 and/or lower shell 508 may also be over molded to form a one piece sealed assembly enclosing an optical splitting device and unexposed portions of first connector 504 and/or second connector 506. Splitter module 206 may have an exemplary length on the order of 5.5 inches, an exemplary width on the order of 0.5 inches, and an exemplary height on the order of 1 inch. Another implementation of splitter module 206 may be implemented with a length of 5.6 inches, a width of 0.65 inches and a height of 1.1 inches and having a volume on the order of 4 cu-in. Implementations of splitter module 206 may take other forms and/or sizes without departing from the spirit of the invention.

FIG. 5B illustrates a top view of an exemplary implementation of splitter module 206 consistent with the principles of the invention. Implementations may employ a splitter module shell having a standard size that may be adapted to accommodate a number of optical splitting devices made by a number of manufacturers. The use of a standard sized shell may reduce the number of inventoried parts required to outfit enclosures with optical splitting capabilities.

FIG. 5C illustrates an end view showing the inputs to an exemplary implementation of splitter module 206 consistent with the principles of the invention. Implementations of splitter module 206 may include SC, SC-II, LC, MU, MT-RJ, MT or ferrule self (1.25 mm and/or 2.5 mm), and/or MT-multi (e.g., 4, 8, 12 fiber) connectors. Other types of optical connectors and/or adapters may also be used without departing from the spirit of the invention.

Figure 6B:
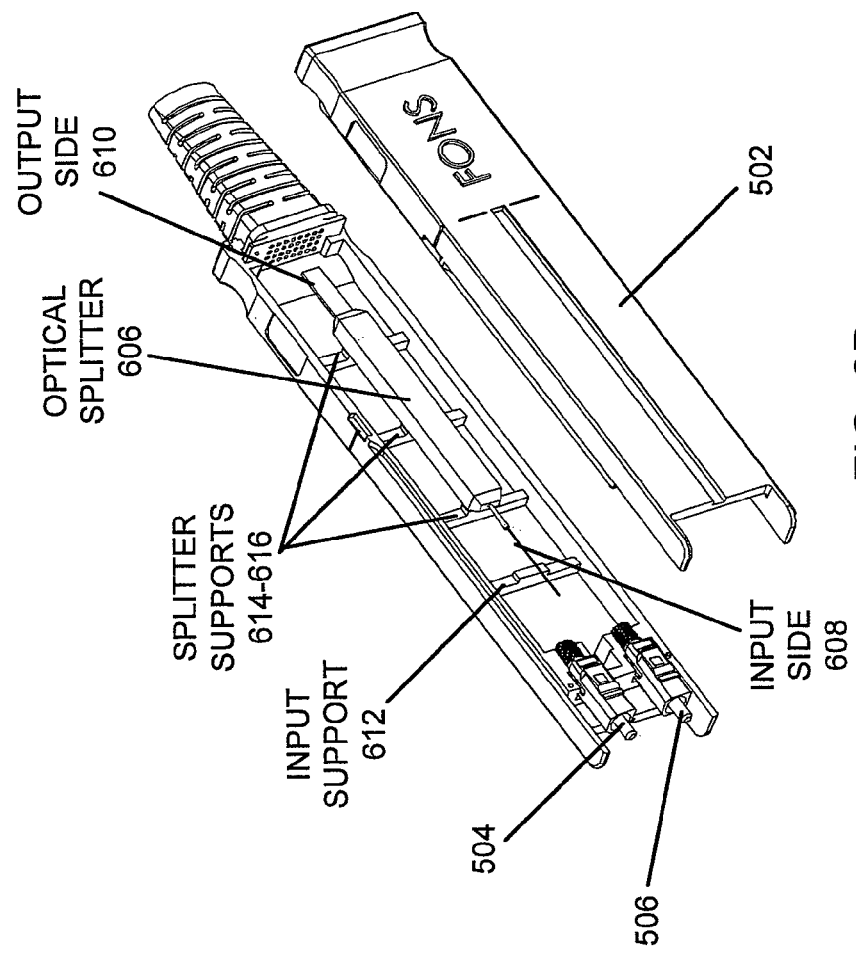
FIG. 6B illustrates components that may be used in an exemplary implementation of a splitter module consistent with the principles of the invention.
Figure 6A:
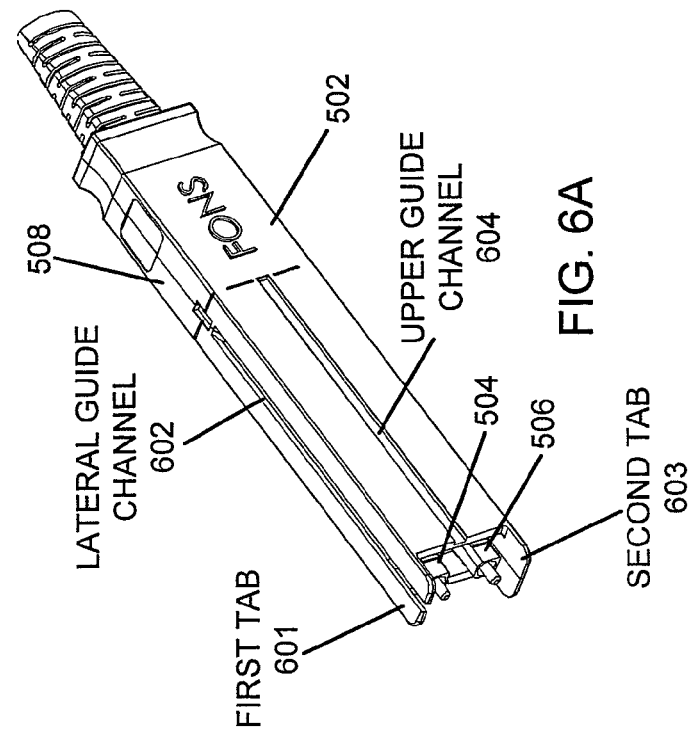
FIG. 6A illustrates a perspective view of an exemplary implementation of splitter module 206 consistent with the principles of the invention.

FIG. 6A illustrates a perspective view of an exemplary implementation of a splitter module 206 consistent with the principles of the invention. The implementation of FIG. 6A may include a first tab 601, a lateral guide channel 602, a second tab 603, and/or an upper guide channel 604. Upper tab 601 and lower tab 603 may be configured and arranged to protect first connector 504 and/or second connector 506 from contact with other structures. First tab 601 and second tab 603 may be formed from a portion of upper shell 502 and/or lower shell 508. Lateral guide channel 602 and/or upper guide channel 604 may be configured and dimensioned to facilitate alignment of optical splitter module 206 with first guide rib 402 (FIG. 4A) and/or second guide rib 404 of splitter module guide 204.

Lateral guide channel 602 and/or upper guide channel 604 may be configured and dimensioned to operate as keys to prevent, for example, a splitter module 206 having two connectors from being mated with an adapter housing 202 having a single connector, and vice versa, and/or the mating of splitter module 206 having a first type of connector from being mated with an incompatible adapter associated with adapter housing 202. Splitter module guide 204 may operate with lateral guide channel 602 and/or upper guide channel 604 to implement keying arrangements and/or techniques. Alternative implementations may replace lateral guide channel 602 and/or upper guide channel 604 with other devices, structures and/or components to facilitate keying and/or alignment of splitter module 206 within splitter module guide 204 to facilitate blind mating and interconnect compatibility between adapter housing 202 and splitter module 206 without departing from the spirit of the invention.

FIG. 6B illustrates components that may be used in an exemplary implementation of splitter module 206 consistent with the principles of the invention. The implementation of FIG. 6B may include an integrated optical splitter 606 having an input side 608 and an output side 610, an input support 612, and splitter supports 614, 615, 616.

Integrated optical splitter 606 may include any device and/or component configured to split an incoming optical signal into two or more outgoing optical signals. Integrated optical splitter 606 may have an input side 608 that is associated with one or more incoming fibers. Integrated optical splitter 606 may accept a single incoming fiber and/or may accept multiple incoming fibers. The incoming fiber may be spliced into substantially any number of outgoing fibers using techniques known in the art. For example, an incoming fiber may be spliced via fusion and/or mechanical techniques to join the incoming fiber to two or more outgoing fibers. An implementation of integrated optical splitter 606 may include an optical splitter manufactured by a number of companies, such as NH Spring Co, LTD. For example, an NH Spring Co, LTD model DW-PKG-32-0282XR1 1:32 splitter may be used and/or a model DW-PKG-16-0281XR1 1:16 splitter may be used without departing from the spirit of the invention. Other types of optical splitting devices may also be used alone or in combination without departing from the spirit of the invention.

Integrated optical splitter 606 may include an output side 610 adapted to make two or more optical fibers available to a destination. Implementations of integrated optical splitter 606 may have output side 610 adapted to make output fibers available to a destination using one or more fiber ribbons. For example, output side 610 may make 16 outputs available via two ribbons each having eight fibers associated therewith, and/or output side 610 may make 32 outputs available via four ribbons each having eight fibers associated therewith. Integrated optical splitter 606 may be implemented in a 1 by X, 2 by X, or Y by X configuration where X and Y may be substantially any integer. A 1 by X implementation may accept one input fiber, a 2 by X implementation may accept two input fibers, and a Y by X implementation may accept Y input fibers.

Upper shell 502 and/or lower shell 508 may operate as a housing that includes supporting structures adapted to maintain incoming fibers, integrated optical splitter 606, and outgoing fibers in determined positions relative to an inner volume formed by upper shell 502 and/or lower shell 508. For example, an input support 612 may be provided to support one or more incoming fibers in a determined position. Upper shell 502 and/or lower shell 508 may include oppositely mounted input supports 612 so that an input fiber is captively retained. Splitter supports 614, 615 and 616 may be provided to support integrated optical splitter 606 in a determined position relative to upper shell 502 and/or lower shell 508.

Upper shell 502 and lower shell 508 may include oppositely mounted splitter supports 614, 615 and 616 to prevent integrated optical splitter 606 from moving relative to upper shell 502 and/or lower shell 508. Upper shell 502 and/or lower shell 508 may include output supports (not shown) to support output fibers if desired.

Implementations of upper shell 502 and/or lower shell 508 may be dimensioned and configured to operate with substantially any number of integrated optical splitters 606. For example, splitter supports 614, 615 and 616 may be configured to operate with particular models and/or quantities of integrated optical splitter 606. Alternatively, upper shell 502 and/or lower shell 508 may be adapted to use removable splitter supports 614, 615 and 616 to facilitate the use of more than one type of integrated optical splitter 606. Alternatively, integrated optical splitter 606 may be attached to upper shell 502 and/or lower shell 508 via adhesive and/or other bonding techniques if desired.

Figure 7:
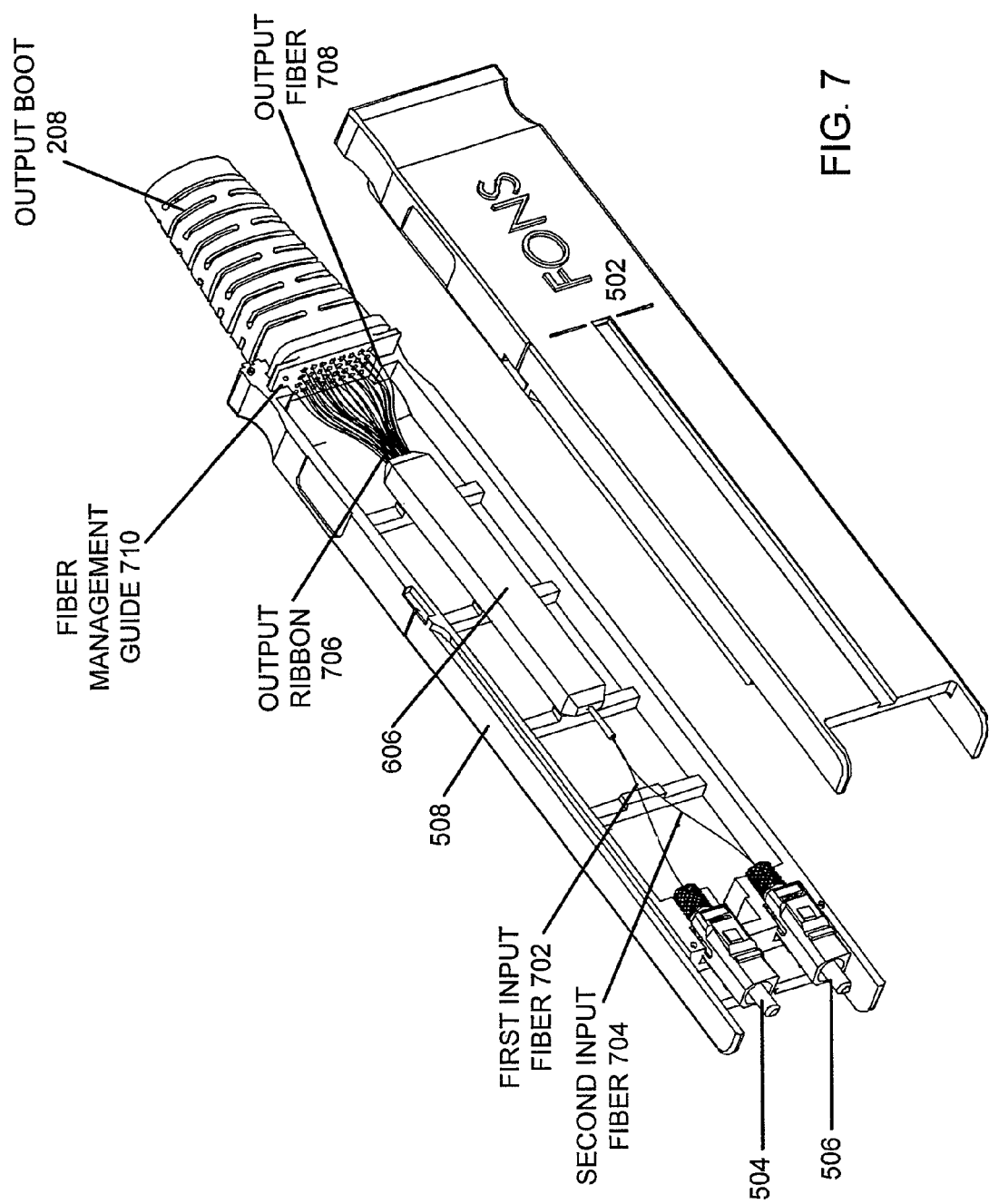
FIG. 7 illustrates an exemplary configuration of components that may be used in an exemplary implementation of a splitter module.

FIG. 7 illustrates an exemplary configuration of components that may be used in an exemplary implementation of splitter module 206. The implementation of FIG. 7 may include a first input fiber 702, a second input fiber 704, an output ribbon 706, an output fiber 708, a fiber management guide 710, and output boot 208.

First and second input fiber 702, 704 may include any type of optical fiber capable of carrying an optical signal. First input fiber 702 may be coupled to first connector 504 and second input fiber 704 may be coupled to second connector 506. Implementations may facilitate connection of first and second input fiber 702, 704 to integrated optical splitter 606 without the use of fiber loops within splitter module 206. Output ribbon 706 may include two or more groups of output fibers 708 that may be used to convey output signals to one or more destinations. Output fiber 708 may pass through a fiber management guide 710 en route to a destination, such as a subscriber termination in an enclosure. Output ribbons 706, may be replaced by individual output fibers without departing from the spirit of the invention.

Fiber management guide 710 may include any device and/or structure configured to maintain one or more optical fibers and/or ribbons in a desired arrangement. Fiber management guide 710 may incorporate overtubes to guide output fibers through output boot 208. Overtubes may be affixed to fiber management guide 710 and output fibers may be run through the overtubes. Overtubes may be affixed to fiber management guide 710 via adhesive and/or other bonding techniques. Fiber management guide 710 may operate in conjunction with output boot 208 to guide output fibers to a destination. Output fiber 708 may be terminated with a connector adapted to mate with a subscriber termination associated with a subscriber premises. Output boot 208 may operate as a single strain relief device for substantially all output fibers passing through fiber management guide 710.

Figure 8B:
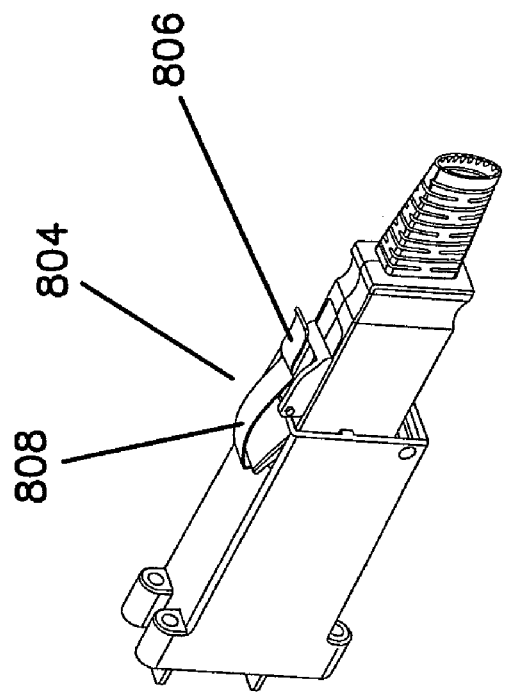
FIGS. 8A and 8B illustrate exemplary latching devices that may be used for coupling a splitter module to an exemplary implementation of a splitter module guide consistent with the principles of the invention.
Figure 8A:
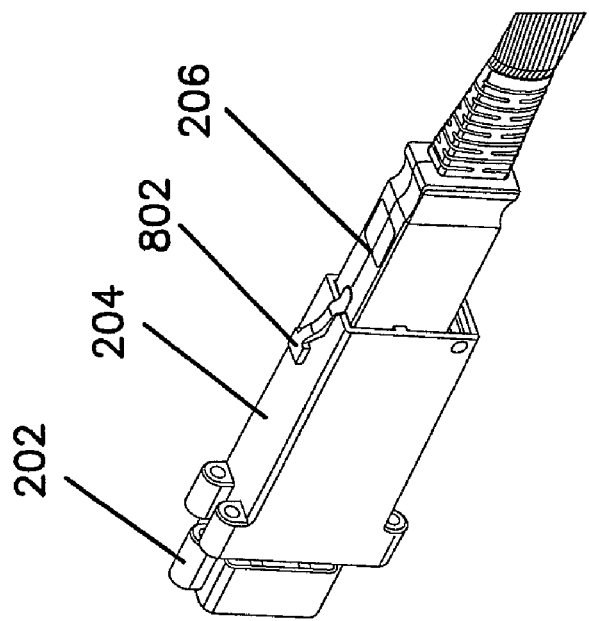

FIGS. 8A and 8B illustrate exemplary latching devices that may be used for coupling splitter module 206 to an exemplary implementation of splitter module guide 204 consistent with the principles of the invention. The implementation of FIG. 8A may include a pivoting retaining lever 802. Pivoting retaining lever 802 may be adapted to engage a portion of optical splitter module 206 when in a closed position. Alternatively, pivoting retaining lever 802 may be adapted to engage a portion of splitter module guide 204. Implementations may employ a single pivoting retaining lever 802 and/or multiple pivoting retaining levers. Pivoting retaining lever 802 may be configured and dimensioned so that a linesman may operate pivoting retaining lever 802 with one hand. Splitter module 206 and/or splitter module guide 204 may be configured with devices and/or structures to facilitate engagement with a latching device and/or to provide a linesman with an audible, tangible, and/or visual indication of engagement and/or disengagement of the latching device with splitter module 206 and/or splitter module guide 204.

FIG. 8B illustrates a retaining device 804 that may include a latching member 806 and a tensioning member 808. Latching member 806 may include any device and/or structure configured to engage tensioning member 808 when in a closed position. Tensioning member 808 may include any device and/or structure configured to provide a retaining force when engaged by latching member 806. Tensioning member 808 may be fabricated from spring steel, composite, rubber, plastic, and the like. Tensioning member 808 may be configured with a hook on a distal end to engage latching member 806. Latching member 806 may operate to exert a force on tensioning member 808 when in a closed position. Retaining device 804 may be configured and dimensioned so that a linesman may manipulate retaining device 804 with one hand.

Figure 8C:
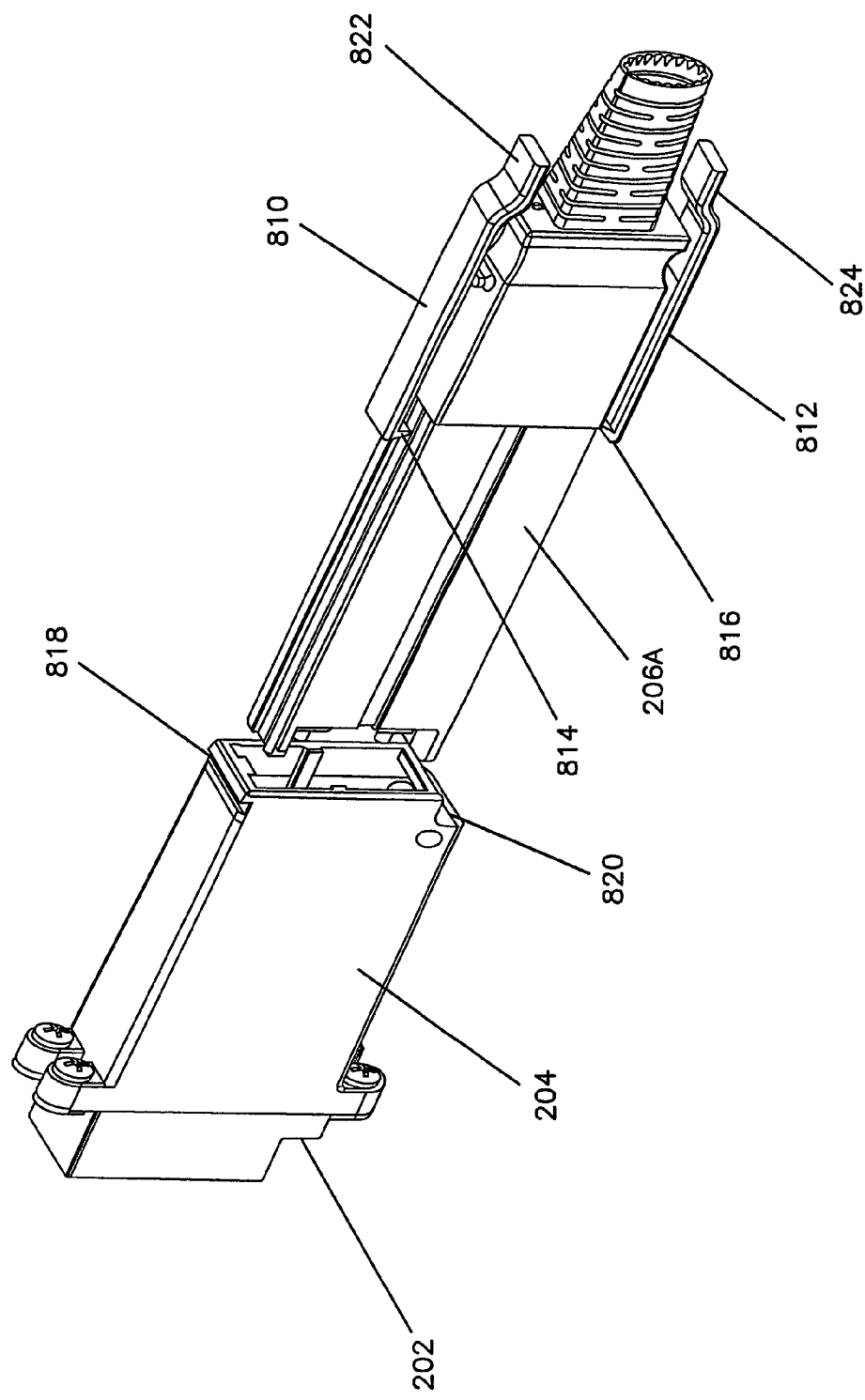
FIGS. 8C and 8D illustrate an exemplary retaining device that may be used for coupling a splitter module to an exemplary implementation of a splitter module guide consistent with the principles of the invention.
Figure 8D:
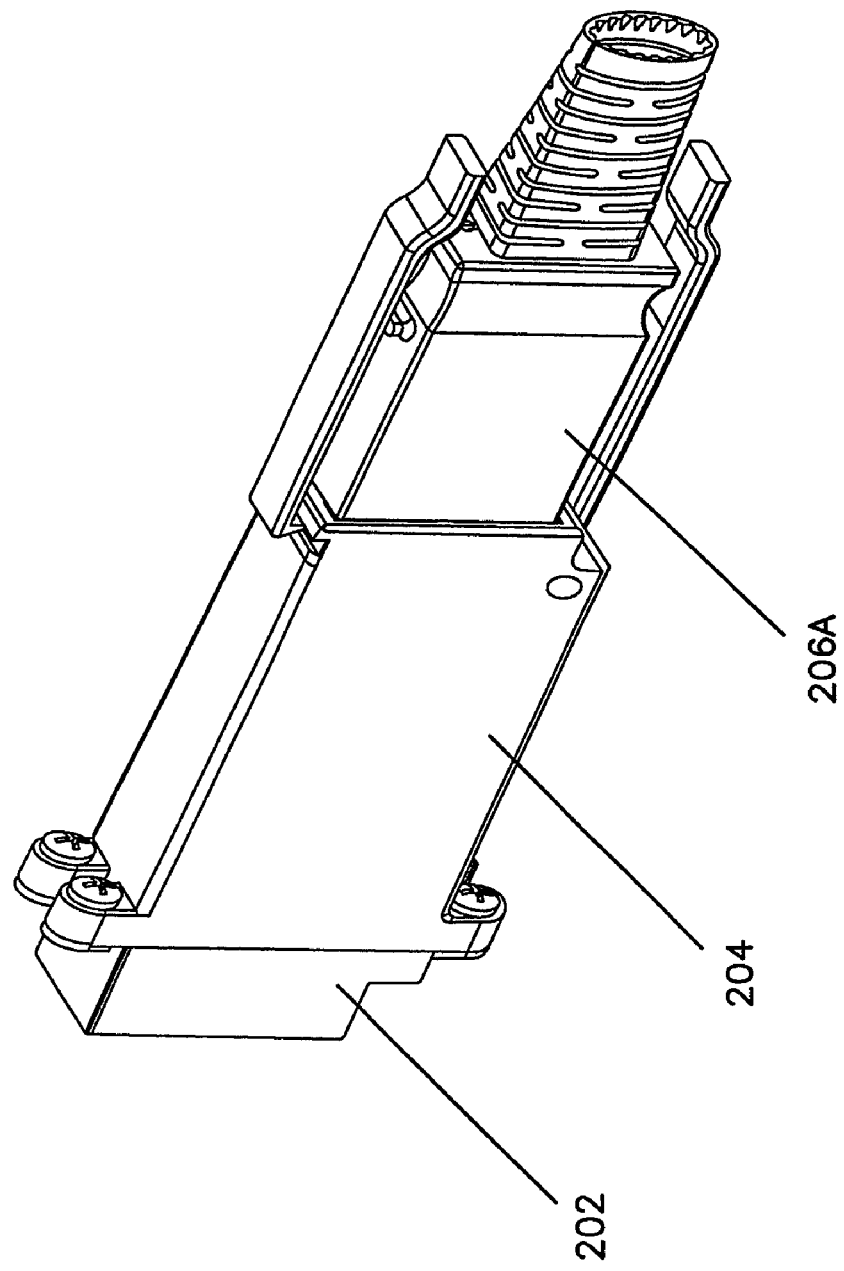

FIGS. 8C and 8D illustrate an exemplary retaining device that may be used for coupling splitter module 206A to an exemplary implementation of splitter module guide 204 consistent with the principles of the invention. Splitter module 206A may be configured to include an upper coupling member 810 having an upper coupling surface 814, and a lower coupling member 812 having a lower coupling surface 816. Splitter module guide 204 may include an upper mating surface 818 and a lower mating surface 820.

Upper coupling member 810 and/or lower coupling member 812 may include any device and/or structure configured to retain splitter module 206A in a determined position relative to splitter module guide 204 and/or adapter housing 202. Upper coupling member 810 and/or lower coupling member 812 may be fabricated from metal, plastic and/or composite and may be moveably coupled to splitter module 206A in a manner allowing upper coupling member 810 and/or lower coupling member 812 to exert a retaining force on upper mating surface 818 and/or lower mating surface 820. Upper coupling member 810 may include an upper coupling surface 814 that may be configured and dimensioned to mate with upper mating surface 818.

Lower coupling member 812 may include a lower coupling surface 816 that may be configured and dimensioned to mate with lower mating surface 820. Applying a force on upper distal portion 822 and/or lower distal portion 824 may cause upper coupling surface 814 and/or lower coupling surface 816 to be displaced outward (i.e., away from optical splitter module 206A) to facilitate engagement and/or disengagement of splitter module 206A with splitter module guide 204 and/or adapter housing 202.

FIG. 8D illustrates splitter module 206A in a mated, or engaged, position with respect to splitter module guide 204 and/or adapter housing 202.

Figure 8E:
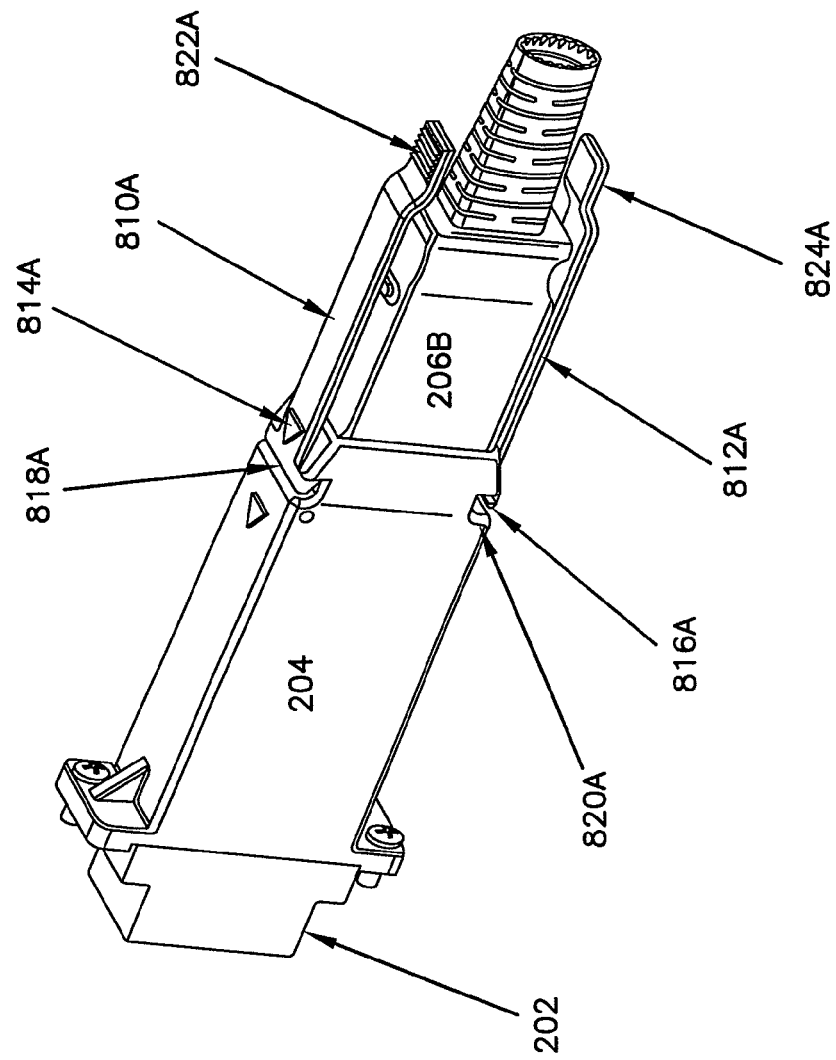
FIGS. 8E and 8F illustrate an exemplary retaining device that may be used to couple a splitter module to an exemplary implementation of a splitter module guide consistent with the principles of the invention.
Figure 8F:
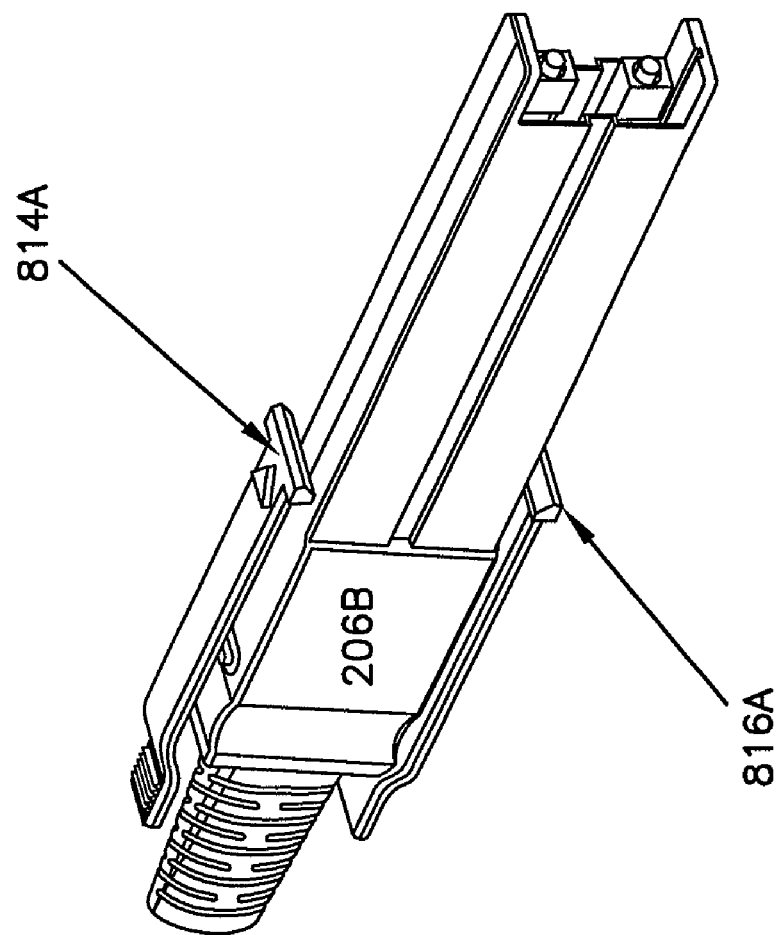

FIGS. 8E and 8F illustrate an exemplary retaining device that may be used to couple splitter module 206B to an exemplary implementation of splitter module guide 204 consistent with the principles of the invention. The implementation illustrated in FIG. 8E may include an upper coupling member 810A, a lower coupling member 812A, an upper coupling surface 814A, a lower coupling surface 816A, an upper mating surface 818A, a lower mating surface 820A, an upper distal portion 822A, and a lower distal portion 824A. Upper coupling member 810A, lower coupling member 812A, upper coupling surface 814A, lower coupling surface 816A, upper mating surface 818A, lower mating surface 820A, upper distal portion 822A, and lower distal portion 824A may be similar to their counterparts discussed in connection with FIG. 8C.

Upper coupling surface 814A and lower coupling surface 816A may be configured to move into upper mating surface 818A and lower mating surface 820A, respectively. Upper mating surface 818A and lower mating surface 820A may include any contoured surface configured to receive upper coupling surface 814A or lower coupling surface 816A. In one implementation, upper mating surface 818A and lower mating surface 820A may each include a channel adapted to receive coupling surfaces associated with splitter module 206B.

Upper mating surface 818A and lower mating surface 820A may be tapered to facilitate receipt of a coupling surface. Upper coupling surface 814A and lower coupling surface 816A may be angled and/or tapered to facilitate mating with upper mating surface 818A and lower mating surface 820A, respectively. Upper coupling surface 814A and lower coupling surface 816A may exert pressure toward a center line of splitter module guide 204 in cooperation with upper coupling member 810A and lower coupling member 812A, respectively. Exerted pressure may operate to keep the mating surfaces and coupling surfaces in a determined relationship. Applying pressure on upper distal portion 822A and lower distal portion 824A may operate to disengage upper coupling surface 814A and lower coupling surface 816A from upper mating surface 818A and lower mating surface 820A, respectively. FIG. 8F illustrates a perspective view of splitter module 206B that shows upper coupling surface 814A and lower mating surface 816A in more detail.

Figure 8G:
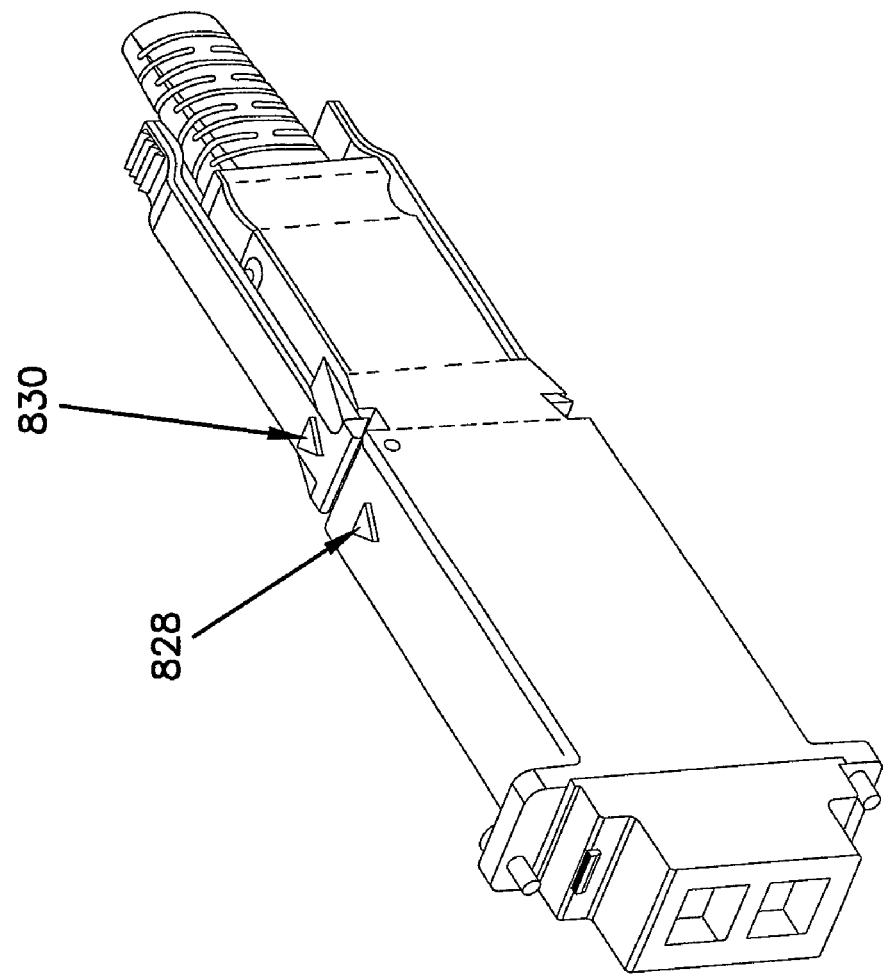
FIG. 8G illustrates exemplary alignment aides that can be used to facilitate alignment of a splitter module with a splitter module guide consistent with the principles of the invention.

FIG. 8G illustrates exemplary alignment aides that can be used to facilitate alignment of splitter module 206B with splitter module guide 204 consistent with the principles of the invention. First alignment aide 828 and second alignment aide 830 may include any device, structure and/or technique for aligning a first object with a second object. For example, a top surface of splitter module guide 204 may include a raised surface having a shape of a triangle, where a corner of the triangle faces in a direction that corresponds to a direction in which splitter module 206B is displaced when engaging splitter module guide 204. The raised surface may be first alignment aide 828.

Splitter module 206B may include a raised surface having a shape similar to first alignment aide 828. The raised surface on splitter module 206B may be a second alignment aide 830. Second alignment aide 830 may be arranged on a top surface of splitter module 206B so that a corner of the triangle faces in a direction that corresponds to a direction in which splitter module 206B is displaced when engaging splitter module guide 204. First alignment aide 828 and second alignment aide 830 may include textured, colored, and/or shaped devices and/or structures that can be used to facilitate the alignment of one object with another object. First alignment aide 828 and second alignment aide 830 may include passive devices, such as textured surfaces, and/or active devices, such as light emitting diodes (LEDs). First alignment aide 828 and second alignment aide 830 may operate alone or with upper and/or lower coupling surfaces 814A and 814B and/or with upper and/or lower mating surfaces 818A and 818B.

Figure 8H:
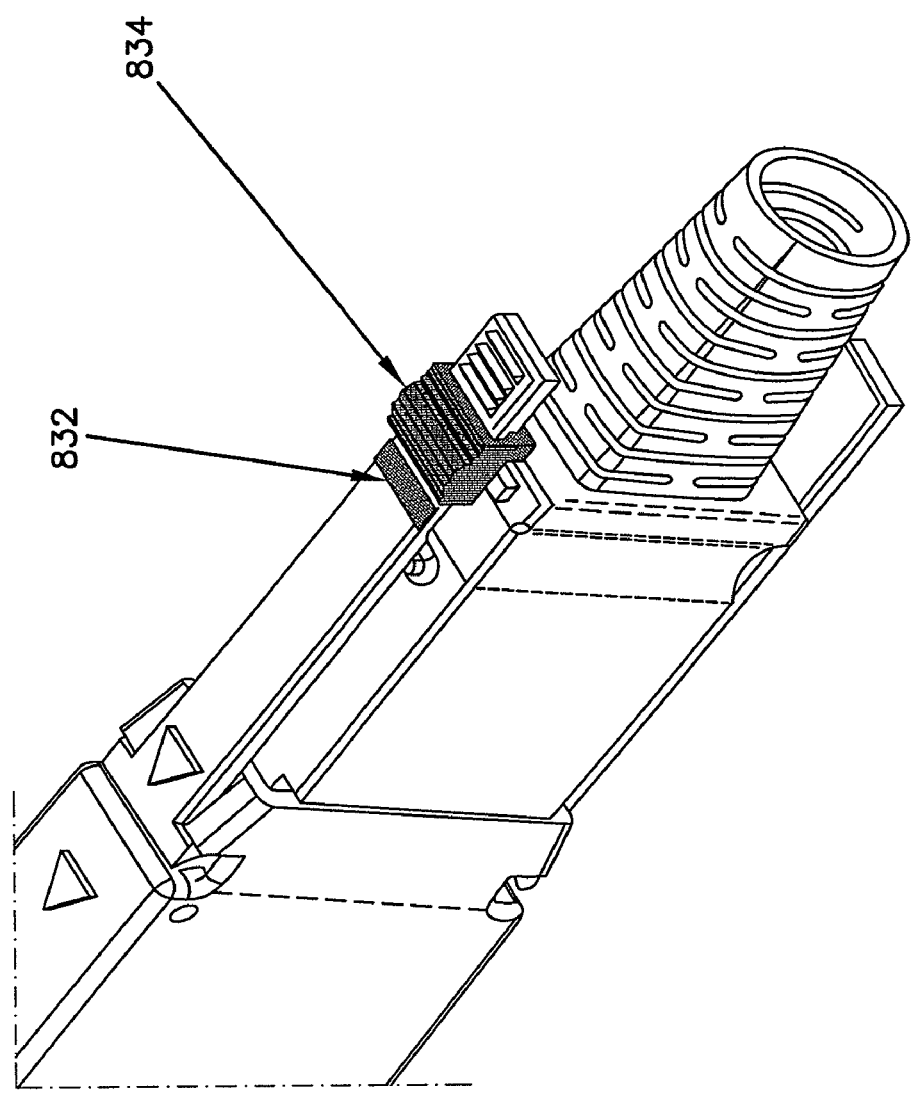
FIGS. 8H-8K illustrate various views of an exemplary lock device that can be used to retain a splitter module in a determined relationship with a splitter module guide consistent with the principles of the invention.
Figure 8I:
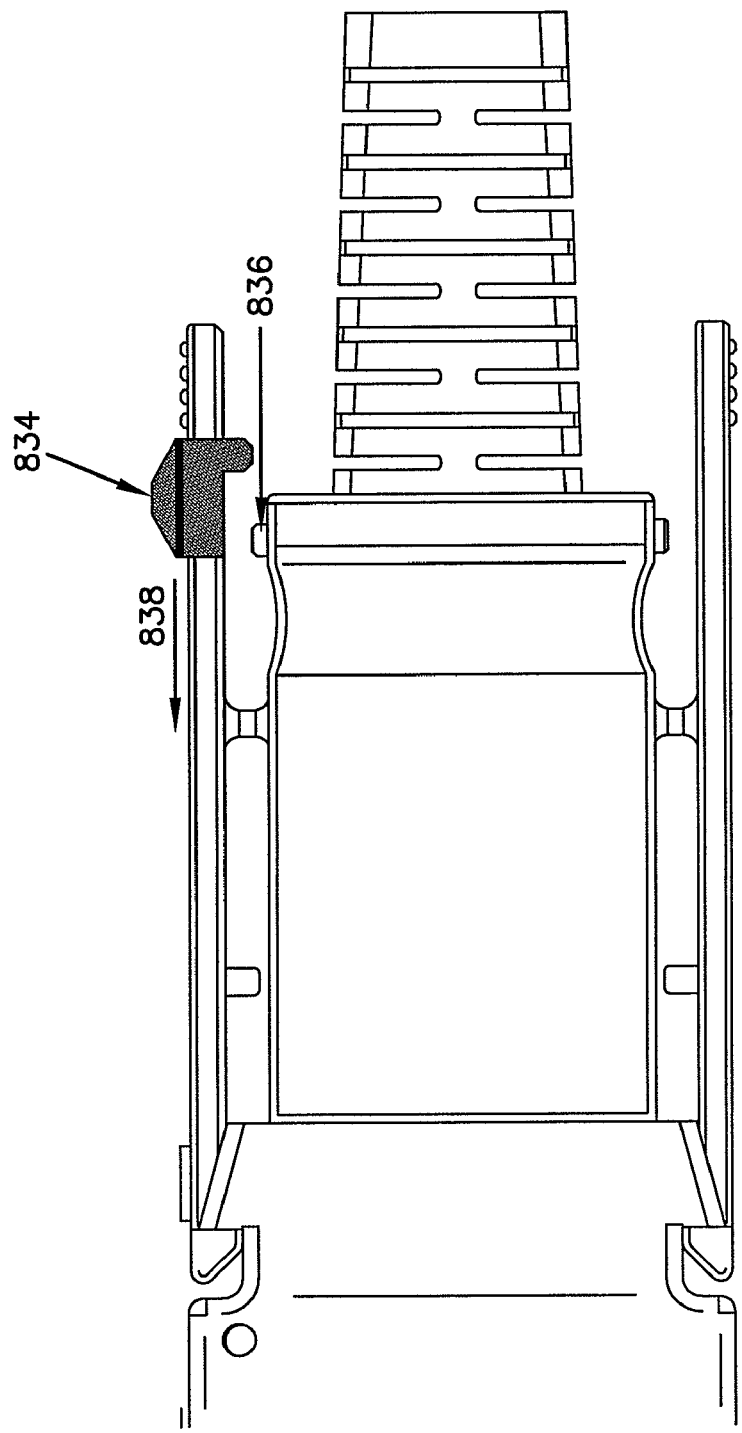

FIGS. 8H-8K illustrate various views of an exemplary lock device that can be used to retain splitter module 206B in a determined relationship with splitter module guide 204 consistent with the principles of the invention. A region proximate to upper distal portion 822A and/or lower distal portion 824A may be equipped with an unlocked indicator 832 and/or a lock device 834 (FIG. 8H). Unlocked indicator 832 may include any device, structure and/or technique adapted to indicate a status of lock device 834. Unlocked indicator 832 may include passive and/or active devices, structures and/or techniques.

Lock device 834 may include any device and/or structure that can be configured to retain a coupling surface in a determined relationship with a mating surface. For example, lock device 834 may operate alone or with other devices and/or structures to retain upper coupling surface 814A in a determined relationship, such as a mated relationship, with upper mating surface 818A. Lock device 834 may operate to discourage disengagement of upper coupling surface 814A from upper mating surface 818A. Lock device 834 may be fabricated from plastic, composite, rubber, metal and/or other suitable materials. Lock device 834 may be color coded to facilitate identification of splitter module 206B. For example, a lock device 834 may have a first color to identify a splitter module having one optical connector and another lock device 834 may have a second color to identify a splitter module having two optical connectors.

Lock device 834 may operate with a lock support member 836 (FIG. 8I) to retain upper coupling surface 814A in a determined position. For example, lock device 834 may have a lip or other protuberance that is configured to be supported by lock support member 836 when in a locked position. Lock device 834 may be moved into a locked position by sliding lock device 834 in a locking direction 838. Lock device 834 may be moved into an unlocked position by, for example, sliding lock device 834 in a direction opposite to locking direction 838.

Figure 8J:
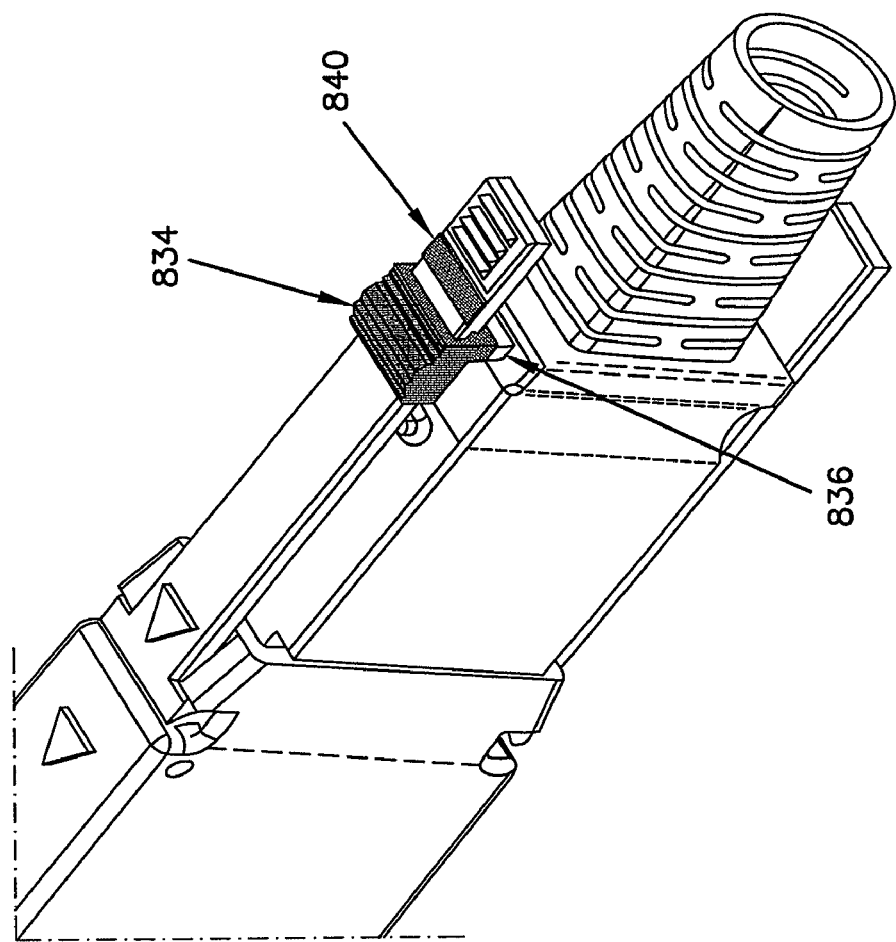

Lock device 834 may operate in conjunction with a locked indicator (FIG. 8J). Locked indicator 840 may include any device, structure and/or technique for identifying a locked position of lock device 834. Locked indicator 840 may be textured and/or colored and may operate in cooperation with unlocked indicator 832. For example, unlocked indicator 832 may have a first color, such as green, and locked indicator 840 may have a second color, such as red.

Figure 8K:
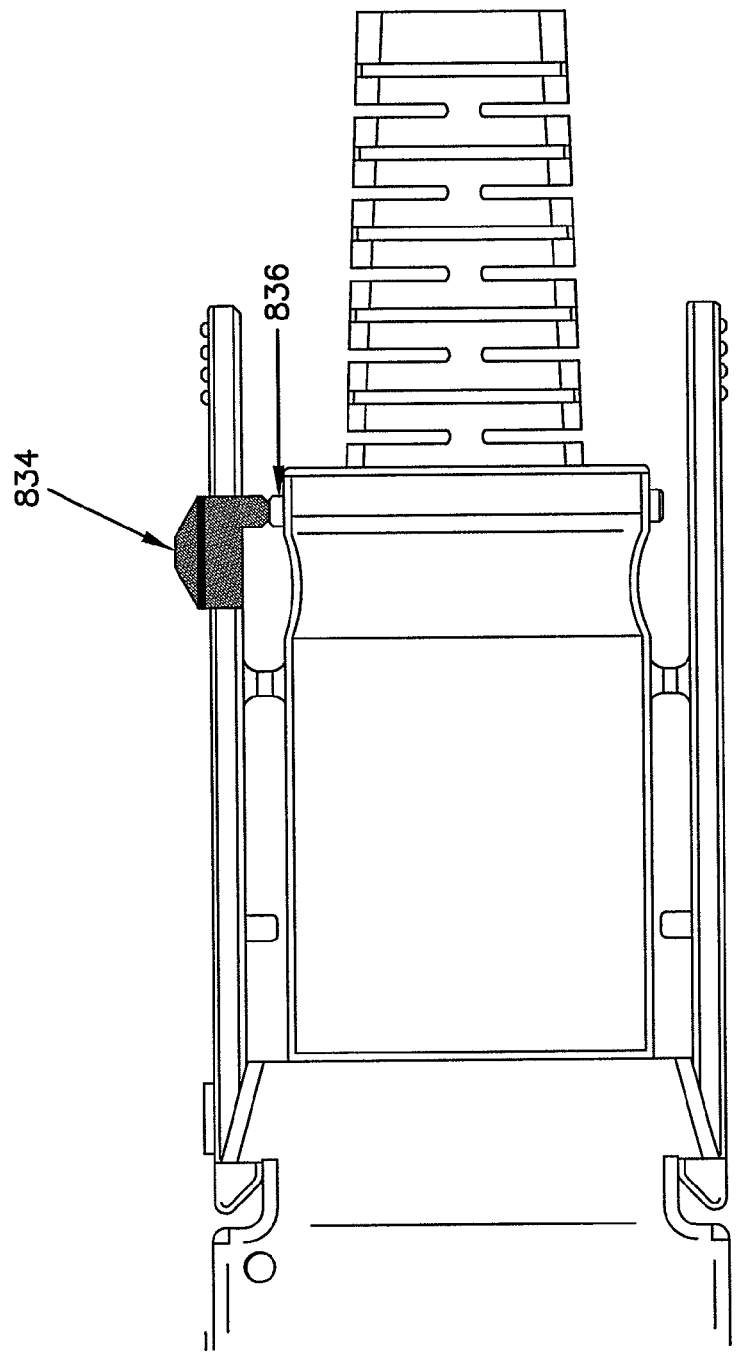

FIG. 8K illustrates a side view of lock device 834 in a locked position in conjunction with lock support member 836. The implementations illustrated in FIGS. 8A-8K may be configured to be operated via a single hand and may be configured to provide a visual and/or tactile indication of a locked and/or unlocked status. For example, sliding lock device 834 into a locked position may expose locked indicator 840 and/or may produce an audible click, or other sound.

FIG. 9A illustrates an exemplary arrangement of splitter assemblies 112 supported on a shelf consistent with the principles of the invention. The implementation of FIG. 9A may include an upper shelf 902 and one or more distribution fibers 901. Upper shelf 902 may include any device and/or structure configured to support one or more splitter assemblies 112 in a determined position. Upper shelf 902 may include a splitter mounting panel 916 (FIG. 9B) to facilitate the mounting and operation of splitter assemblies 112. Splitter mounting panel 916 may include a substantially flat surface arranged at an angle with respect to upper shelf 902. For example, splitter mounting panel 916 may be mounted substantially perpendicular to upper shelf 902.

FIG. 9B illustrates an exemplary arrangement of splitter module shelves in an enclosure consistent with the principles of the invention. Frame 900 may include incoming fibers 901, upper shelf 902, middle shelf 904, lower shelf 906, first side 908, second side 910, base 912, fiber guide 914, fiber radius guide 915 and splitter mounting panel 916. Middle shelf 904 and/or lower shelf 906 may include any device and/or structure configured to support a splitter assembly 112. Upper shelf 902, middle shelf 904 and lower shelf 906 may include one or more fiber guides 914, fiber radius guides 915 and/or splitter mounting panels 916.

First side 908, second side 910 and base 912 may include any device and/or structure that can be configured and arranged to support upper shelf 902, middle shelf 904 and/or lower shelf 906 as an assembly. First side 908, second side 910 and base 912 may be fabricated from metal, plastic, composite and/or wood and may be coupled together using fasteners, welding techniques, and/or adhesive-based bonding techniques.

Upper shelf 902, middle shelf 904, and/or lower shelf 906 may include one or more fiber guides 914 that may be configured to maintain optical fibers in a determined position. For example, upper shelf 902 may include fiber radius guide 915 that may be configured to maintain a determined bend radius for one or more optical fibers associated with splitter assemblies 112. For example, fiber radius guide 915 may be configured to maintain a specified minimum bend radius, such as a manufacturer and/or industry specified minimum bend radius, for output fibers exiting splitter module 206.

Splitter mounting panel 916 may be configured to support multiple splitter assemblies 112 in a determined arrangement. Splitter mounting panel 916 may be configured to reside between adapter housing 202 and splitter module guide 204 such that adapter housing 202 abuts a rear surface of splitter mounting panel 916 and splitter module guide 204 abuts a front surface of splitter mounting panel 916. For example, splitter mounting panel 916 may be arranged at an angle, such as approximately ninety degrees, with respect to upper shelf 902, middle shelf 904 and/or lower shelf 906. Splitter mounting panel 916 may operate alone or in combination with other devices and/or structures as an adaptable backplane to facilitate mounting disclosed implementations into enclosures manufactured by entities other than an entity that manufactured splitter module 206, splitter module 204 and/or adapter housing 202.

For example, implementations of splitter assemblies 112 may be adapted to mount into a portion of an enclosure configured to handle conventional optical splitters having input pigtails that were spliced to distribution fiber 111 and that are manufactured by an entity other than the manufacturer of implementations disclosed herein. For example, a spliced distribution fiber may be terminated with a connector that can be coupled to an adapter associated with adapter housing 202. Adapter housing 202 may be on a rear face of splitter mounting panel 916 and splitter module guide 204 may be mounted to a front face of splitter mounting panel 916. Implementations of splitter module 206 may be used with the distribution fiber to convey optical signals to subscribers.

Frame 900 may be mounted on a swing frame to facilitate pivoting the entire assembly around a pivoting location to provide access to rear portions of the assembly. For example, a swing frame may allow a linesman working at the front of an enclosure to gain access to distribution fiber 901 without requiring that the linesman operate in an awkward manner, such as by not being able to see a connector associated with distribution fiber 901. Frame 900 may employ a latching device to maintain the frame in a first position, such as a closed position, and/or a second position, such as an open position. Alternative implementations may employ swing frames on portions of frame 900. For example, upper shelf 902 may be mounted on a swing frame such that upper shelf 902 may be swung from a first position to a second position. When swinging implementations of frame 900 and/or shelves associated with frame 900 are used, additional slack may be provided in distribution fiber 901 and/or output pigtails so that optical fibers are not stretched, pinched, or bent in a manner that violates a recommended minimum bend radius.

Figure 9C:
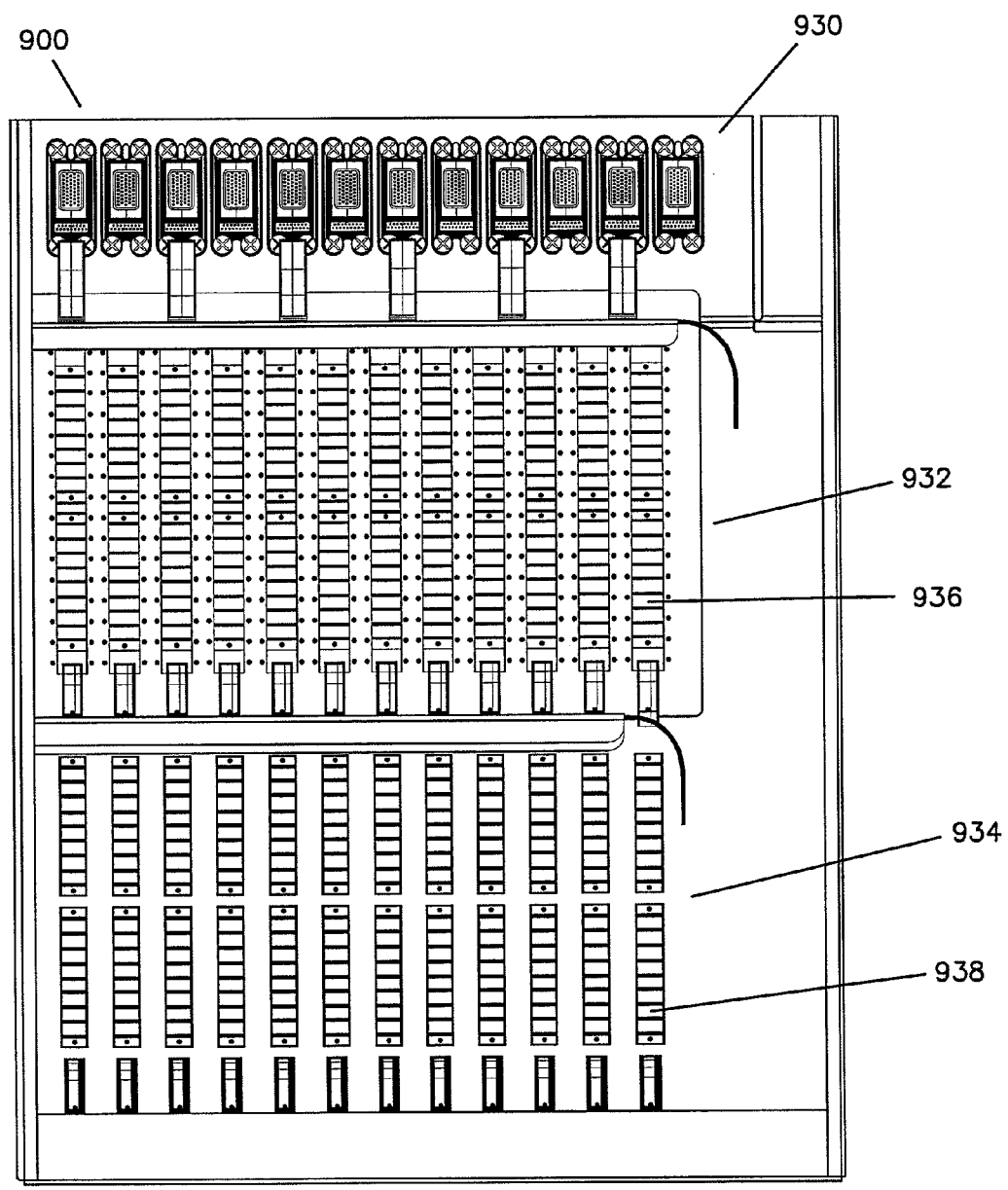
FIG. 9C illustrates an exemplary arrangement of splitter assemblies and subscriber terminations consistent with the principles of the invention.

FIG. 9C illustrates an exemplary arrangement of splitter assemblies 112, subscriber terminations, and parking adapters consistent with the principles of the invention. Frame 900 may include an adapter mounting area 930, a subscriber termination area 932 having a subscriber termination module 936, and a parking area 934 having a parking module 938. Frame 900 may be sized to fit into an equipment enclosure, such as a fiber distribution hub.

Adapter mounting area 930 may include any device and/or structure configured to support one or more splitter assemblies 112. Implementations may employ an adapter mounting area 930 that is configured to support upper shelf 902, middle shelf 904 and/or lower shelf 906. Adapter mounting area 930 may be configured on a swing frame that lets adapter mounting area 930 swing independently from other portions of frame 900. In other implementations, adapter mounting area 930 may be configured to swing in conjunction with other portions of frame 900.

Subscriber termination area 932 may include any device and/or structure configured to support one or more subscriber termination modules 936. Subscriber termination area 932 may operate to make optical signals available to subscribers via a subscriber port coupled to a drop fiber 116 (FIG. 1) associated with ONT 114. ONT 114 may be associated with a subscriber. Subscriber termination module 936 may include any device and/or structure configured to receive an optical connector and/or adapter associated with an optical signal intended for a destination.

Parking area 934 may include any device and/or structure configured to support one or more parking modules 938. Parking module 938 may include any device and/or structure configured to facilitate parking of connectors and/or adapters associated with optical fibers. For example, parking module 938 may include a group of receptacles and/or adapters configured and dimensioned to receive an optical connector and/or adapter associated with an output pigtail. Splitter assemblies 112 may be configured with output pigtails that may be terminated with connectors and/or adapters, such as SC/APC, SC/UPC, ST, FC, and LC. The output pigtails may be of varying lengths and/or may be of the same length. Parking area 934 may also be adapted to receive an end of splitter module 206 having connectors associated therewith to protect the connectors from debris.

Output pigtails may be routed within an enclosure so that pigtail connectors can be plugged into a receptacle and/or adapter associated with parking module 938 when not coupled to a subscriber termination port. Employing parking module 938 may prevent dirt and debris from accumulating on output pigtail connectors and/or adapters when not in use. When a subscriber is connected to an output pigtail, the output pigtail connector may be removed from a parking location and plugged into the appropriate subscriber termination to make an optical signal available to ONT 114. Output pigtails may be dimensioned so as to facilitate circumferential routing within an enclosure. Circumferential routing may prevent tangling of pigtails as they are removed from a parked location and coupled to a subscriber termination by providing an organized routing scheme for manipulating pigtails within an enclosure.

Figure 10:
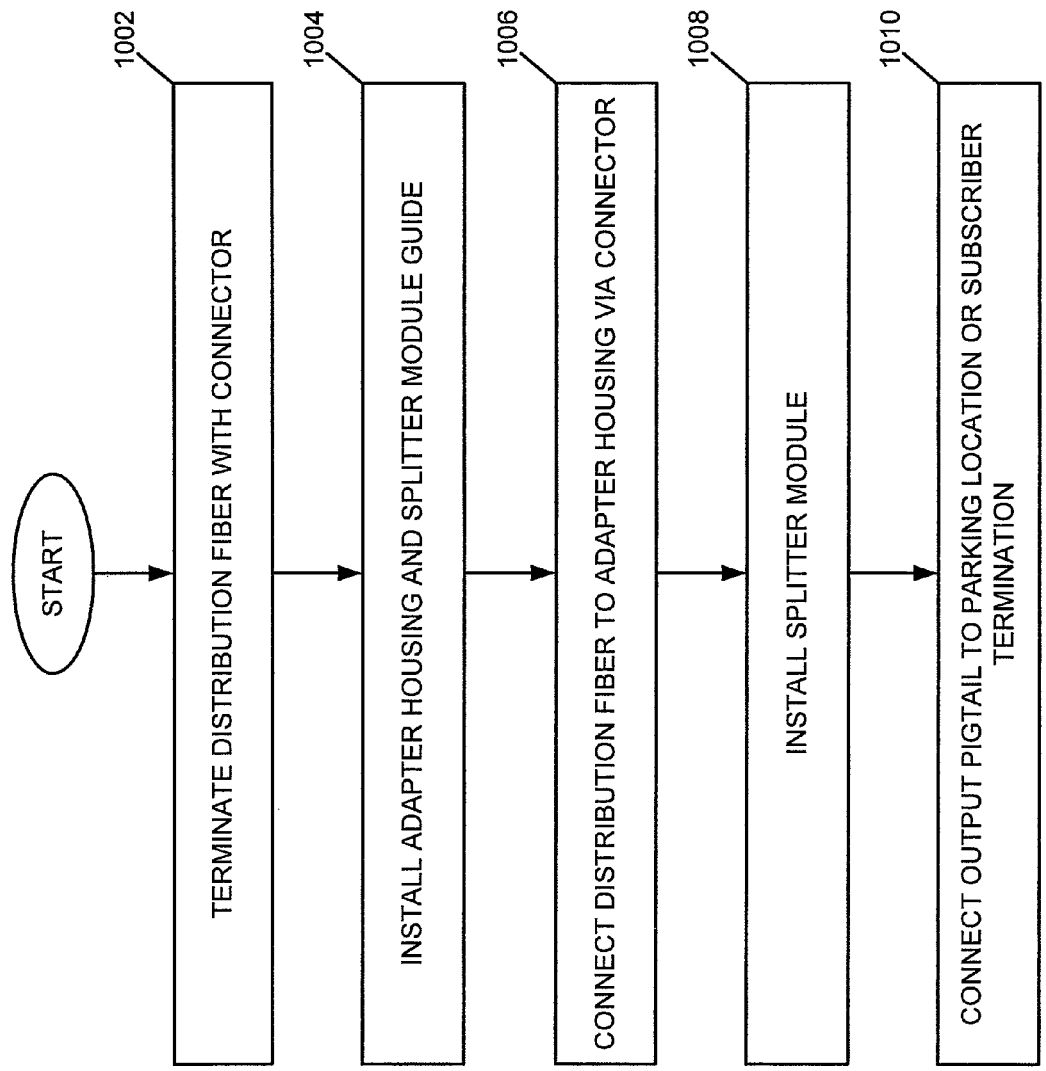
FIG. 10 illustrates an exemplary method for coupling a distribution fiber to a splitter module consistent with the principles of the invention.

FIG. 10 illustrates an exemplary method for coupling distribution fiber 111 to a splitter assembly 112 consistent with the principles of the invention. A distribution fiber 111 may be terminated with a connector (act 1002). The connector may be configured to mate with an adapter associated with an adapter housing 202. Adapter housing 202 and splitter module guide 204 may be installed in an enclosure that includes distribution fiber 111 (act 1004). Distribution fiber 111 may be connected to a first end of an adapter associated with adapter housing 202 via the connector attached to distribution fiber 111 in act 1002 (act 1006). An optical signal, here referred to as a distribution signal, may be provided to the first end of the adapter when the distribution fiber connector is coupled to the adapter. Splitter module guide 204 may be installed proximate to adapter housing 202. For example, adapter housing 202 may be installed on a rear surface of a bulkhead panel and splitter module guide 204 may be installed on a front surface in a manner that exposes adapters in adapter housing 202 to splitter module guide 204. An optical splitter module 206 may be installed in splitter module guide 204 by a linesman (act 1008). The distribution signal may be provided to one or more output pigtails when optical splitter module 206 is coupled to a second end of the adapter associated with the adapter housing 202 in cooperation with splitter module guide 204. An output pigtail may be connected to a parking location and/or a subscriber termination via a connector associated with the output pigtail (act 1010). If the output pigtail is connected to a subscriber termination, a subscriber may participate in bidirectional communication with OLT 102 via the distribution signal.

CONCLUSION

Systems and methods consistent with the invention make possible the fabrication and deployment of compact optical splitter modules for passive optical networks.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

Implementations consistent with the principles of the invention can be implemented using connectors, receptacles, over-molding techniques, and/or methods other than those illustrated in the figures and described in the specification without departing from the spirit of the invention. For example, components used in splitter assembly 112 may be fabricated from polycarbonate and/or ABS via machining, injection molding, etc. In addition, active components can be used in conjunction with the passive components described herein. Electronic devices, such as computers and radio frequency identification (RFID) tags, may be used to facilitate automated testing and/or inventorying of devices used within enclosures. In addition, the sequence of events associated with the methods described herein can be performed in orders other than those illustrated. Furthermore, additional events can be added, or removed, depending on specific deployments, applications, and the needs of users, linesmen, and/or service providers. Further, disclosed implementations may not be limited to any specific combination of hardware circuitry and/or software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A splitter module comprising:
    a first input adapted to receive a first incoming optical signal;
    an input fiber adapted to carry the first incoming optical signal from the first input;
    a splitter adapted to receive the incoming optical signal via the input fiber and to split the incoming optical signal into a plurality of output optical signals;
    a plurality of first output fibers adapted to receive the plurality of first output signals from the splitter via a plurality of proximal ends and to make the first output signals available to a destination via a plurality of distal ends;
    a strain relief boot through which the first output fibers are routed, the strain relief boot extending between a first end and a distal end, wherein the distal ends of the first output fibers extend outwardly from the strain relief boot;
    a housing to which the first end of the strain relief boot is connected, the distal end of the strain relief boot being spaced from the housing, the housing generally aligning the first input, the splitter, and the boot so that the input and output fibers can be routed between the first input, the splitter, and the boot without using fiber loops, the housing defining a guide channel extending longitudinally along an exterior of the housing.

2. The splitter module as claimed in claim 1, wherein the first input includes a first fiber optic connector.

3. The splitter module as claimed in claim 2, further comprising a fiber management guide positioned within the housing between the splitter and the strain relief boot.

4. The splitter module as claimed in claim 1, further comprising:
    a second input adapted to receive a second incoming optical signal;
    a second input fiber adapted to carry the second incoming optical signal from the second input to the splitter without using fiber loops; and
    a plurality of second output fibers coupled to the splitter and routed through the strain relief boot;
    wherein the splitter is adapted to split the second incoming optical signal into a plurality of second output optical signals that are carried by the second output fibers.

5. The splitter module as claimed in claim 4, wherein the second output fibers have distal ends that make the second output optical signals available to a different destination than the first output optical signals.

6. The splitter module as claimed in claim 4, wherein the second input includes a second fiber optic connector.

7. The splitter module as claimed in claim 1, further comprising a fiber management guide positioned within the housing between the splitter and the strain relief boot.

8. The splitter module as claimed in claim 7, further comprising overtubes secured to the fiber management guide, the overtubes configured to route the first output fibers through the strain relief boot.

9. The splitter module as claimed in claim 1, wherein the first output fibers form an optical ribbon cable.

10. The splitter module as claimed in claim 1, wherein the distal ends of the first output fibers are terminated by a fiber optic connector.

11. A splitter module comprising:
    a splitter module housing including at least one module alignment structure located at an exterior of the splitter module housing;
    a first optical connector positioned at one end of the splitter module housing, the first optical connector terminating a first input fiber adapted to carry a first incoming optical signal;
    a splitter positioned within the splitter module housing, the splitter being adapted to receive the incoming optical signal via the first input fiber and to split the incoming optical signal into a plurality of output optical signals;
    a plurality of first output fibers adapted to receive the plurality of first output signals from the splitter via a plurality of proximal ends and to make the first output signals available to a destination via a plurality of distal ends, the distal ends being located external of the splitter module housing; and
    a strain relief boot coupled to the splitter module housing, the strain relief boot providing strain relief and inhibiting bending of the first output fibers beyond a maximum bend radius of the first output fibers, wherein the distal ends of the first output fibers extend outwardly from the strain relief boot.

12. The splitter module as claimed in claim 11, wherein the strain relief boot extends outwardly from the splitter module housing.

13. The splitter module as claimed in claim 12, wherein the strain relief boot tapers inwardly as the boot extends outwardly from the splitter module housing.

14. The splitter module as claimed in claim 12, further comprising a fiber management guide positioned within the housing between the splitter and the strain relief boot.

15. The splitter module as claimed in claim 14, further comprising overtubes secured to the fiber management guide, the overtubes configured to route the first output fibers through the strain relief boot.

16. The splitter module as claimed in claim 11, further comprising:
    a second optical connector positioned at the end of the splitter module housing, the second optical connector terminating a second input fiber adapted to carry a second incoming optical signal to the splitter without using fiber loops; and
    a plurality of second output fibers coupled to the splitter and routed through the strain relief boot, wherein the splitter is adapted to split the second incoming optical signal into a plurality of second output optical signals that are carried by the second output fibers.

17. The splitter module as claimed in claim 16, wherein the second output fibers have distal ends that make the second output optical signals available to a different destination than the first output optical signals.

18. The splitter module as claimed in claim 11, further comprising a fiber management guide positioned within the housing between the splitter and the strain relief boot.

19. The splitter module as claimed in claim 11, wherein the first output fibers form an optical ribbon cable.

20. The splitter module as claimed in claim 11, wherein the distal ends of the first output fibers are terminated by a fiber optic connector.

* * * * *